(12) United States Patent
Shimizukawa et al.

(10) Patent No.: US 12,478,337 B2
(45) Date of Patent: Nov. 25, 2025

(54) COMPUTED TOMOGRAPHY APPARATUS

(71) Applicant: FUJIFILM CORPORATION, Tokyo (JP)

(72) Inventors: Sho Shimizukawa, Kanagawa (JP); Takashi Tajima, Kanagawa (JP); Tatsuya Taneichi, Kanagawa (JP); Naoyuki Nishino, Kanagawa (JP); Hisatsugu Horiuchi, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 306 days.

(21) Appl. No.: 18/356,163

(22) Filed: Jul. 20, 2023

(65) Prior Publication Data

US 2024/0065653 A1 Feb. 29, 2024

(30) Foreign Application Priority Data

Aug. 23, 2022 (JP) ................................. 2022-132602

(51) Int. Cl.
*A61B 6/00* (2024.01)
*A61B 6/03* (2006.01)
*A61B 6/04* (2006.01)
*A61B 6/40* (2024.01)

(52) U.S. Cl.
CPC ............ *A61B 6/4014* (2013.01); *A61B 6/032* (2013.01); *A61B 6/0478* (2013.01); *A61B 6/54* (2013.01)

(58) Field of Classification Search
CPC ..... A61B 6/4014; A61B 6/032; A61B 6/0478; A61B 6/54; A61B 6/4452; A61B 6/4435; A61B 6/4405; A61B 6/035
See application file for complete search history.

(56) References Cited

U.S. PATENT DOCUMENTS

2008/0101533 A1* 5/2008 Ein-Gal ................. A61B 6/032
378/9

FOREIGN PATENT DOCUMENTS

JP 2006-187453 A 7/2006

* cited by examiner

*Primary Examiner* — Courtney D Thomas
(74) *Attorney, Agent, or Firm* — SOLARIS Intellectual Property Group, PLLC

(57) ABSTRACT

A CT apparatus includes a plurality of imaging units, a rotation mechanism, and a CPU. The imaging unit includes a radiation source and a radiation detector. The rotation mechanism rotates the plurality of imaging units around a body axis of the subject while maintaining a disposition interval. An imaging control unit of the CPU controls operations of the plurality of imaging units and the rotation mechanism. An angular interval that is determined by a frame rate of the radiation detector and a rotation speed of the imaging unit and that defines an acquisition time of a projection image based on the radiation is the same for the plurality of imaging units. The plurality of imaging units have different phases in a rotation direction, and positions where the plurality of imaging units acquire the projection images are separated by a set angle that is less than the angular interval.

11 Claims, 31 Drawing Sheets

FIG. 16
[COMPARATIVE EXAMPLE]
<POSITIONS WHERE FIRST IMAGING UNIT ACQUIRES PROJECTION IMAGES>
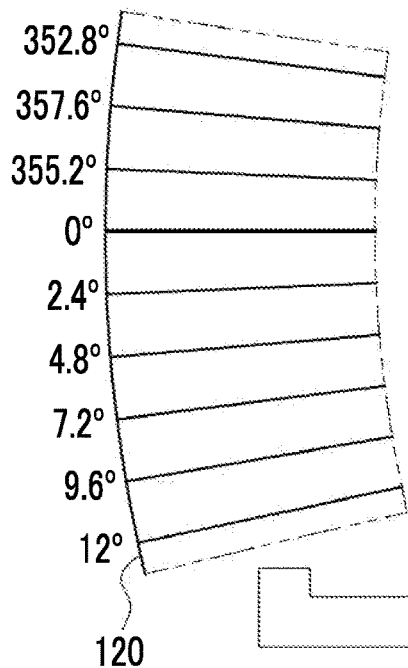
120
<POSITIONS WHERE SECOND IMAGING UNIT ACQUIRES PROJECTION IMAGES>
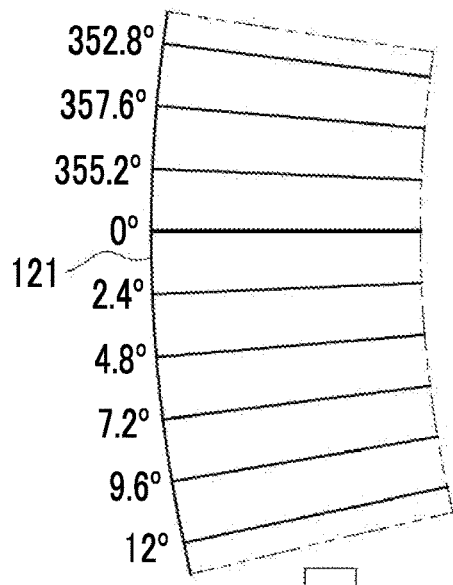
121
<POSITIONS WHERE ALL OF IMAGING UNITS ACQUIRE PROJECTION IMAGES>
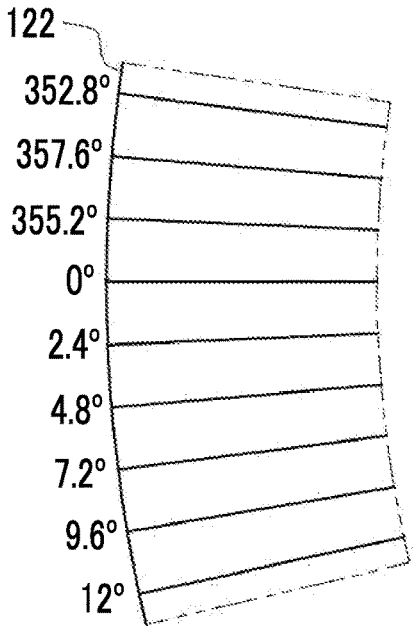
122

FIG. 22
<POSITIONS WHERE FIRST IMAGING UNIT ACQUIRES PROJECTION IMAGES>
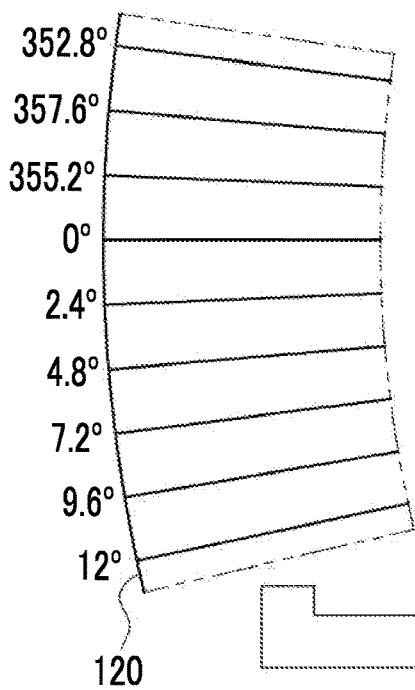
<POSITIONS WHERE SECOND IMAGING UNIT ACQUIRES PROJECTION IMAGES>
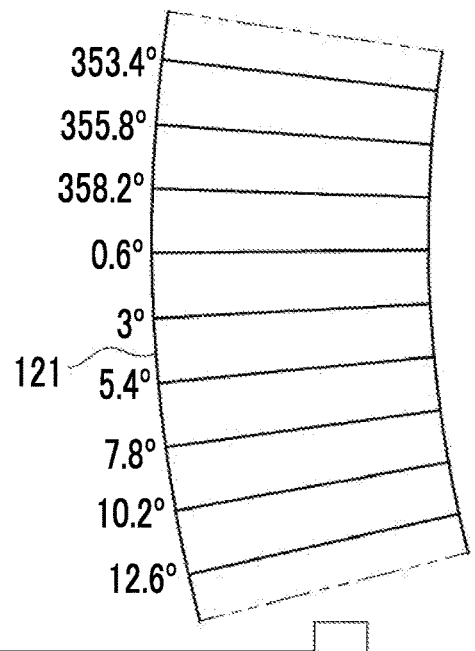
<POSITIONS WHERE ALL OF IMAGING UNITS ACQUIRE PROJECTION IMAGES>
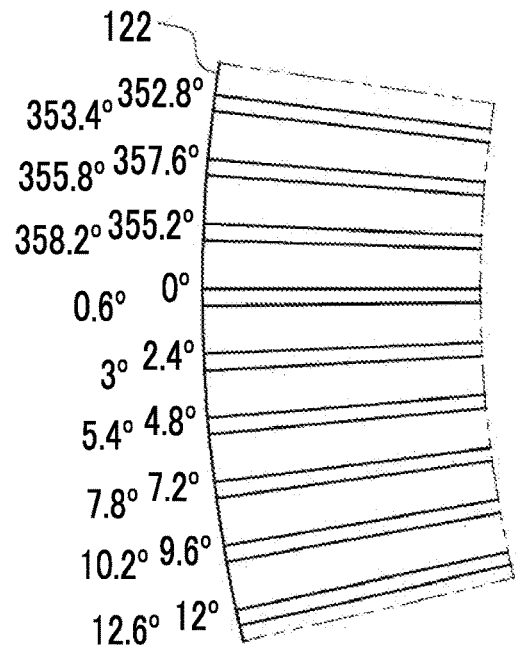

COMPUTED TOMOGRAPHY APPARATUS

CROSS-REFERENCE TO RELATED APPLICATIONS

The present application claims priority under 35 U.S.C. § 119 to Japanese Patent Application No. 2022-132602, filed on Aug. 23, 2022. The above application is hereby expressly incorporated by reference, in its entirety, into the present application.

BACKGROUND

1. Technical Field

The technology of the present disclosure relates to a computed tomography apparatus.

2. Description of the Related Art

JP2006-187453A discloses a computed tomography apparatus (hereinafter, referred to as a CT apparatus) that images a subject in a decubitus posture and comprises a plurality of imaging units, each of which includes a radiation source that emits radiation to the subject and a radiation detector that detects the radiation transmitted through the subject, in order to improve the efficiency of acquiring projection images which are a source of a tomographic image. The plurality of imaging units are disposed at equal intervals in a gantry that is rotated around a body axis of the subject. For example, three imaging units are disposed at every 120°. The radiation source emits a cone beam, and the radiation detector has a configuration in which a plurality of pixels are arranged in a two-dimensional matrix.

SUMMARY

In the CT apparatus described in JP2006-187453A in which the plurality of imaging units are disposed at equal intervals, it is necessary to increase a frame rate of the radiation detector and/or to reduce a rotation speed of the imaging unit in order to increase the angular resolution of the projection image (to reduce a rotation angle of the imaging unit required to acquire the projection image corresponding to one frame). However, there is a limit to the frame rate of the radiation detector. In addition, as the rotation speed of the imaging unit is lower, the time required for imaging is longer. In a case in which it takes a long time to perform imaging, the burden on the subject is increased, and the concern that the quality of the tomographic image will deteriorate due to the body movement of the subject is also increased.

One embodiment according to the technology of the present disclosure provides a computed tomography apparatus that can increase the angular resolution of a projection image without increasing a frame rate of a radiation detector or reducing a rotation speed of an imaging unit.

According to the present disclosure, there is provided a computed tomography apparatus comprising: a plurality of imaging units each of which includes a radiation source that emits radiation having a quadrangular pyramid shape to a subject and a radiation detector in which a plurality of pixels detecting the radiation transmitted through the subject are two-dimensionally arranged; a rotation mechanism that rotates the plurality of imaging units around a body axis of the subject while maintaining a disposition interval; and a processor that controls operations of the plurality of imaging units and the rotation mechanism. An angular interval that is determined by a frame rate of the radiation detector and a rotation speed of the imaging unit and that defines an acquisition time of a projection image based on the radiation is the same for the plurality of imaging units. The plurality of imaging units have different phases in a rotation direction, and positions where the plurality of imaging units acquire the projection images are separated by a set angle that is less than the angular interval.

Preferably, the set angle is an angle obtained by equally dividing the angular interval.

Preferably, the processor makes times when the radiation sources emit the radiation different from each other to correct deviation of the set angle including a manufacturing error.

Preferably, the processor directs all of the plurality of imaging units to emit the radiation during a preset first period and directs all of the plurality of imaging units to output the projection images during a preset second period following the first period.

Preferably, the processor directs the plurality of imaging units to emit the radiation at the same time in the first period and directs the plurality of imaging units to output the projection images at the same time in the second period.

Preferably, the first period is longer than an irradiation time from a start of the emission of the radiation to an end of the emission of the radiation.

Preferably, the processor directs the plurality of imaging units to emit the radiation at different times in the first period without overlapping.

Preferably, the plurality of imaging units are disposed at positions that are separated by an angle that is greater than 90° as viewed from a rotation axis direction of the plurality of imaging units.

Preferably, the radiation detector is disposed at an offset position that is separated from a reference position facing the radiation source by a preset angle as viewed from a rotation axis direction of the plurality of imaging units.

Preferably, the plurality of imaging units are held in a frame, and the subject is positioned in the frame. Preferably, the radiation source is disposed outside the frame, and the radiation detector is disposed inside the frame as viewed from a rotation axis direction of the plurality of imaging units.

Preferably, the subject is positioned in either a standing posture or a sitting posture.

According to the technology of the present disclosure, it is possible to provide a computed tomography apparatus that can increase the angular resolution of a projection image without increasing a frame rate of a radiation detector or reducing a rotation speed of an imaging unit.

BRIEF DESCRIPTION OF THE DRAWINGS

Exemplary embodiments according to the technique of the present disclosure will be described in detail based on the following figures, wherein:

FIG. 16 is a diagram illustrating the positions where the imaging units acquire the projection images in a case in which the positions where the first imaging unit and the second imaging unit acquire the projection images are not separated from each other by a set angle;

FIG. 22 is a diagram illustrating another example of the positions where the first imaging unit, the second imaging unit, and all of the imaging units acquire the projection images;

DETAILED DESCRIPTION

Figure 1:
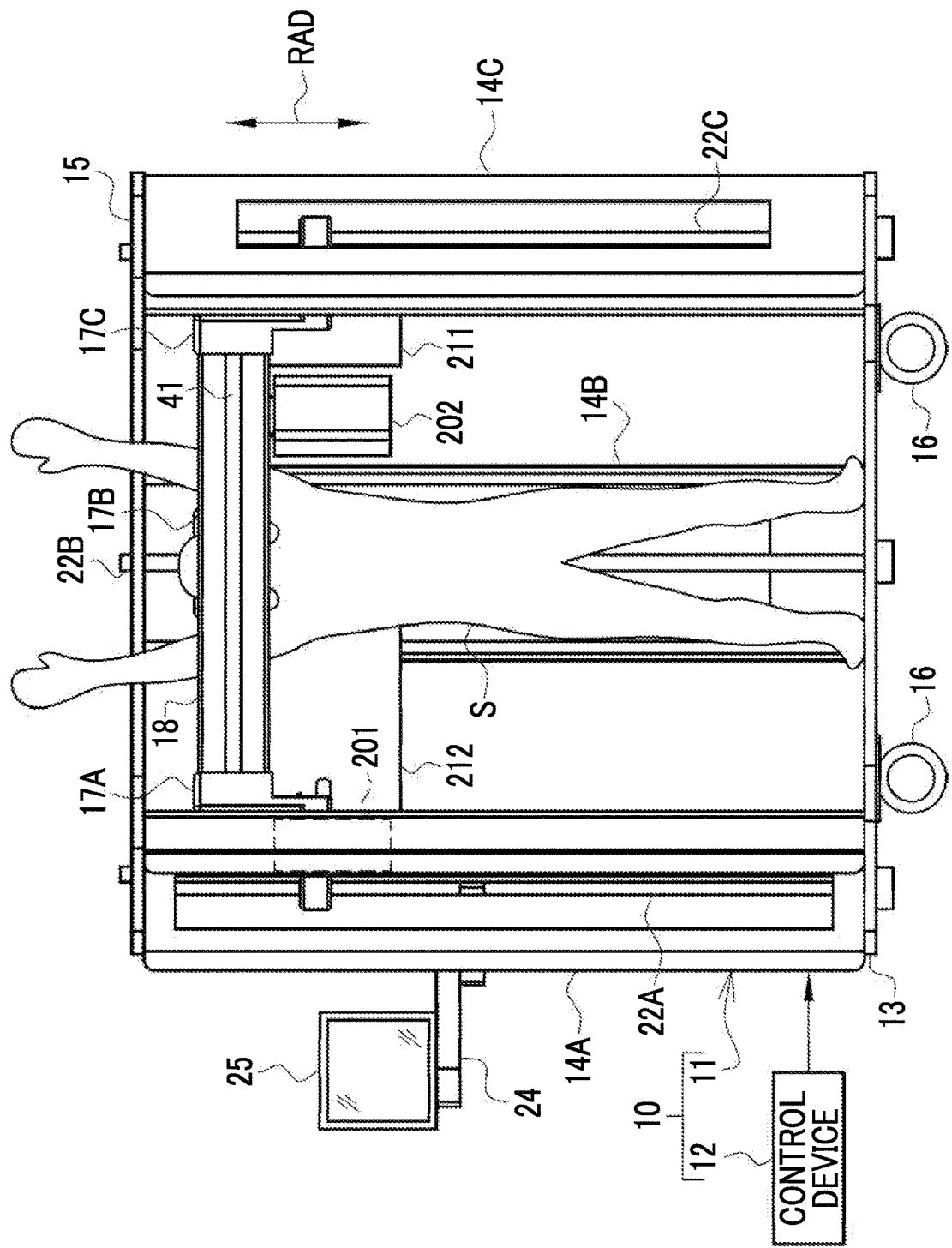
FIG. 1 is a front view illustrating a CT apparatus.

For example, as illustrated in FIG. 1, a CT apparatus 10 is an apparatus for obtaining a tomographic image of a subject S and is composed of an apparatus main body 11 and a control device 12. The apparatus main body 11 is installed, for example, in an imaging room of a medical facility. The control device 12 is installed, for example, in a control room next to the imaging room. The control device 12 is a desktop personal computer, a notebook personal computer, or a tablet terminal. The control device 12 is operated by an operator of the CT apparatus 10 such as a medical radiologist.

Figure 2:
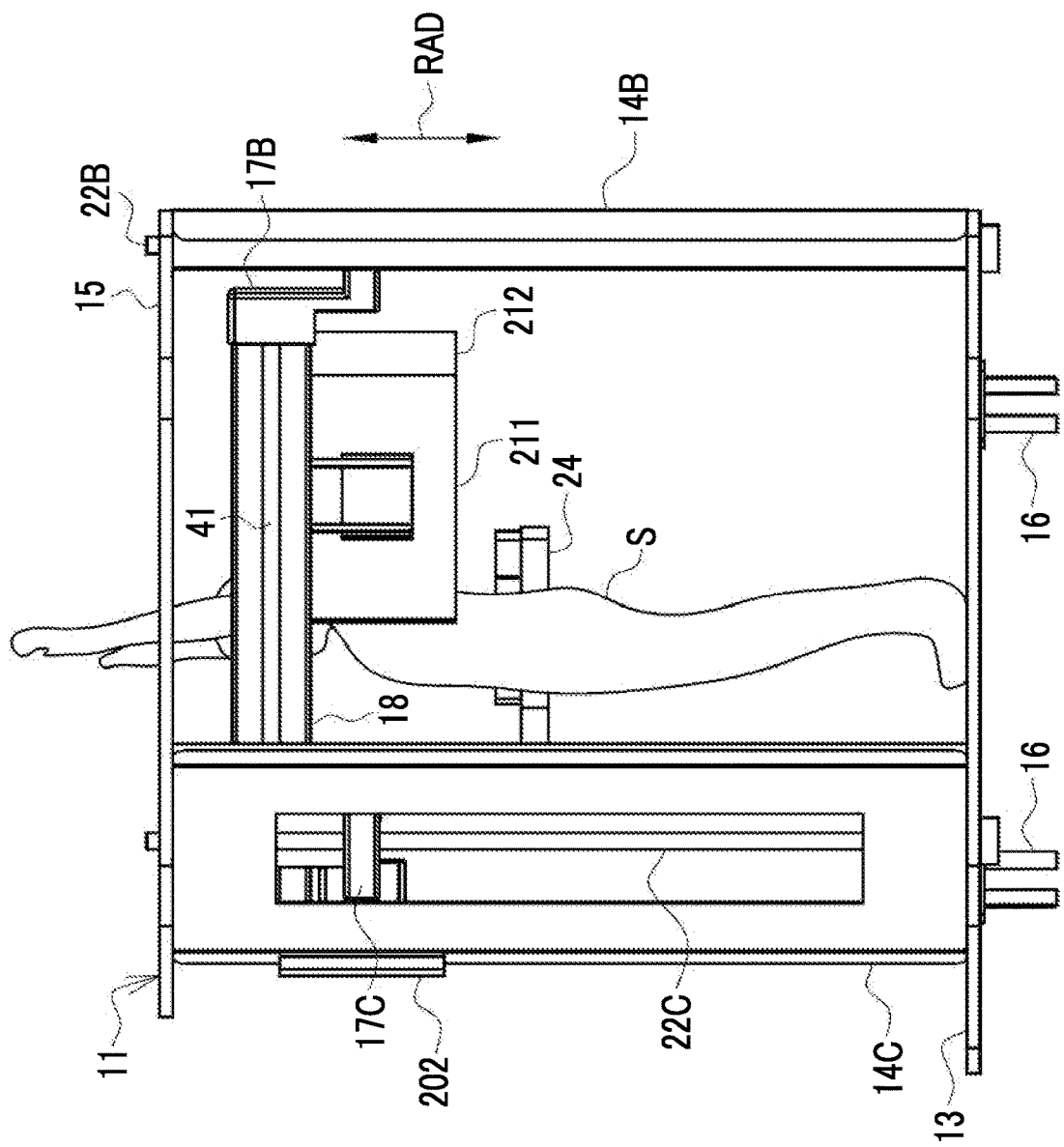
FIG. 2 is a side view illustrating the CT apparatus.

For example, as illustrated in FIG. 2, the apparatus main body 11 comprises a stage 13, three columns 14A, 14B, and 14C, and a top plate 15. The stage 13 is, for example, an octagonal flat plate (see FIG. 6). Casters 16 for transportation are attached to four corners of a rear surface of the stage 13. The caster 16 comprises a rotation lock mechanism (not illustrated). After the apparatus main body 11 is installed at an installation position, the rotation lock mechanism can be operated to lock the rotation of the caster 16. Alternatively, the caster 16 can be removed from the stage 13. The caster 16 can be removed after the apparatus main body 11 is installed at the installation position.

The outer shape of the columns 14A to 14C is a rectangular plate shape, and the columns 14A to 14C are vertically provided at four corners of the surface of the stage 13. The columns 14A and 14C are disposed on the front left and right sides of the apparatus main body 11 (the front left and right sides of the subject S). The column 14B is disposed at the center of the rear side of the apparatus main body 11 (behind the subject S). The top plate 15 is attached to the upper end portions of the columns 14A to 14C. The top plate 15 is, for example, an octagonal flat plate having an outer shape that follows the stage 13 (see FIG. 6). The top plate 15 has a C-shape in which a central portion is hollowed out in a circular shape and a portion corresponding to the front side of the apparatus main body 11 between the columns 14A and 14C is cut out. Further, in the following description, the columns 14A to 14C are collectively referred to as columns 14 in a case in which they do not need to be distinguished from each other.

A connection member 17A is connected to the column 14A, a connection member 17B is connected to the column 14B, and a connection member 17C is connected to the column 14C. A frame 18 is connected to the connection members 17A to 17C. That is, the columns 14A to 14C and the frame 18 are connected to each other through the connection members 17A to 17C. Furthermore, in the following description, the connection members 17A to 17C are collectively referred to as connection members 17 in a case in which they do not need to be distinguished from each other.

The frame 18 has an annular shape. The subject S is positioned at a center C (see FIG. 6) of the annular frame 18. FIGS. 1 and 2 illustrate an aspect in which the subject S in a standing posture with both hands raised above the head is positioned.

The column 14 is provided with a guide rail (not illustrated) to which the connection member 17 is fitted. The connection member 17 and thus the frame 18 can be raised and lowered in the vertical direction along the guide rail. That is, the columns 14 hold the frame 18 to be raised and lowered in the vertical direction. In addition, the frame 18 can be rotated around a body axis of the subject S, using an axis passing through the center C in the vertical direction as a rotation axis RA (see FIG. 3). That is, the columns 14A to 14C hold the frame 18 to be rotatable around the body axis of the subject S. Hereinafter, the center C may be referred to as a rotation center C. An arrow represented by letters RAD indicates a rotation axis direction of the frame 18. The rotation axis direction RAD is parallel to the vertical direction. Here, the body axis is an axis extending from the top of the head to a caudal portion (anus) of the subject S. In a case in which the subject S is in the standing posture or a sitting posture (see FIG. 4), the body axis is parallel to the vertical direction and the rotation axis direction RAD. The term "parallel" means parallel including an error which is generally allowed in the technical field to which the technology of the present disclosure belongs and is not contrary to the gist of the technology of the present disclosure, in addition to perfectly parallel. Further, the columns 14 may be expanded and contracted to change a height position of the frame 18.

A first radiation source 201 and a second radiation source 202 that irradiate the subject S with radiation R (see FIG. 7), such as X-rays or γ-rays, and a first radiation detector 211 and a second radiation detector 212 that detect the radiation R transmitted through the subject S are attached to the frame 18. The first radiation source 201 and the second radiation source 202 have a box shape, and the first radiation detector 211 and the second radiation detector 212 have a rectangular plate shape.

Figure 3:
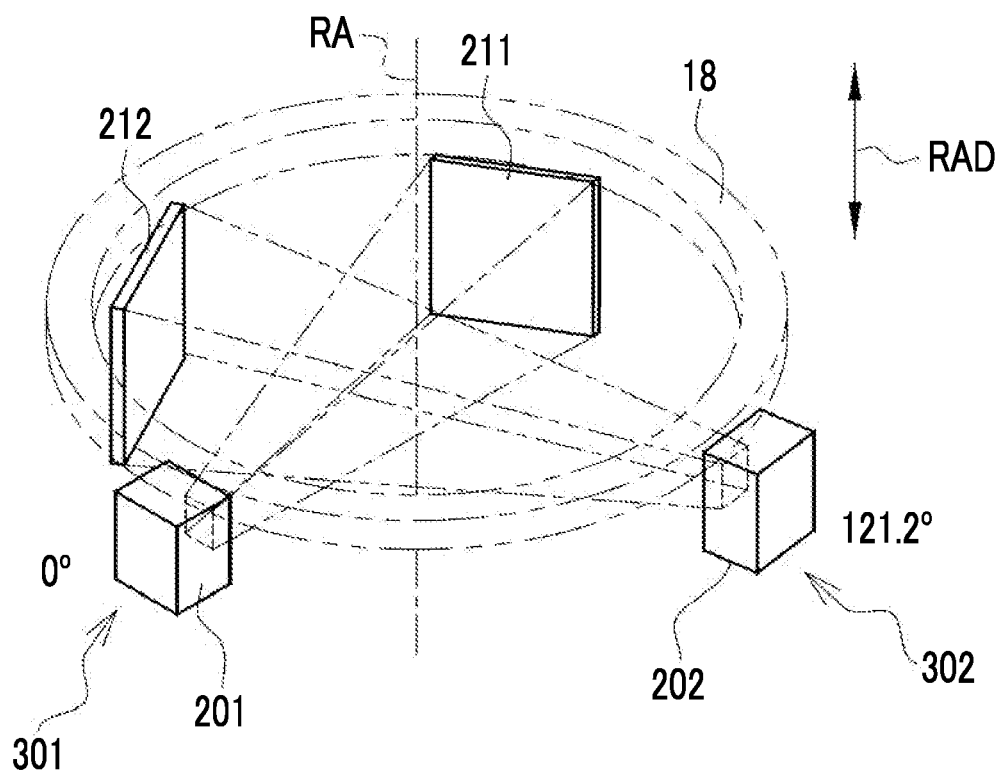
FIG. 3 is a diagram illustrating a configuration of a first imaging unit and a second imaging unit.

For example, as illustrated in FIG. 3, the first radiation source 201 and the first radiation detector 211 constitute a first imaging unit 301. In addition, the second radiation source 202 and the second radiation detector 212 constitute a second imaging unit 302. That is, the CT apparatus 10 has two imaging units of the first imaging unit 301 and the second imaging unit 302. Further, in the following description, the first radiation source 201 and the second radiation source 202 are collectively referred to as radiation sources 20 in a case in which they do not need to be distinguished from each other. In addition, the first radiation detector 211 and the second radiation detector 212 are collectively referred to as radiation detectors 21. Further, the first imaging unit 301 and the second imaging unit 302 are collectively referred to as imaging units 30.

Returning to FIGS. 1 and 2, the column 14A is provided with a screw shaft 22A, the column 14B is provided with a screw shaft 22B, and the column 14C is provided with a screw shaft 22C. The screw shafts 22A to 22C have a height from the stage 13 to the top plate 15. The screw shafts 22A to 22C are rotated to raise and lower the connection members 17A to 17C and thus the frame 18 in the rotation axis direction RAD. In addition, in the following description, the screw shafts 22A to 22C are collectively referred to as screw shafts 22 in a case in which they do not need to be distinguished from each other.

A touch panel display 25 is attached to the column 14A through a movable arm 24. The touch panel display 25 is operated by the operator. In addition, the touch panel display 25 displays various types of information to the operator.

Figure 4:
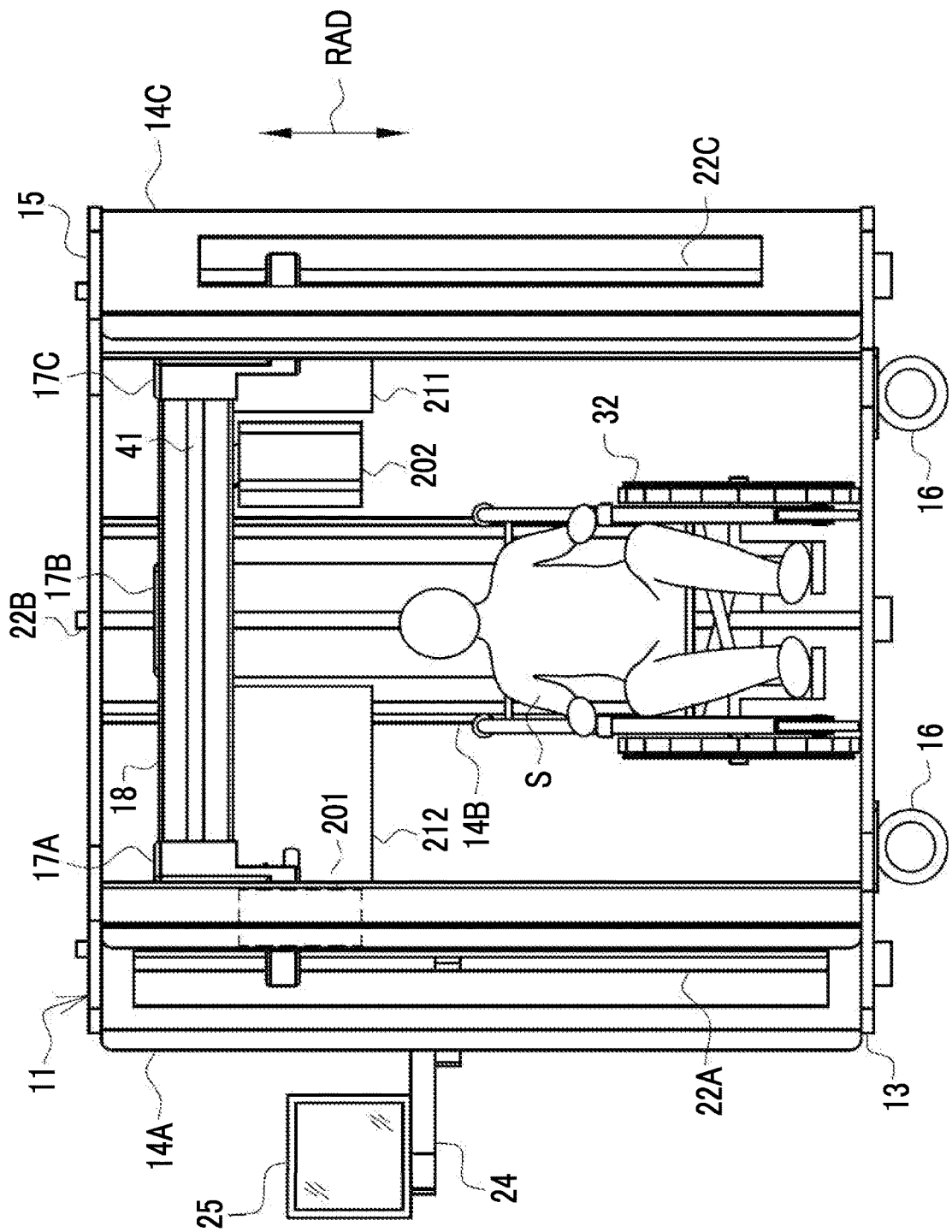
FIG. 4 is a front view of the CT apparatus illustrating a state in which a subject is positioned in a sitting posture on a wheelchair.

FIGS. 1 and 2 illustrate an example in which the subject S is positioned in the frame 18 in the standing posture with both hands raised above the head. However, the present disclosure is not limited thereto. For example, as illustrated in FIG. 4, the CT apparatus 10 can image the subject S who is positioned in the frame 18 in the sitting posture on a wheelchair 32. In addition, either the subject S in the standing posture or the subject S in the sitting posture on the wheelchair 32 is positioned such that the front side faces the columns 14A and 14C and the back side faces the support column 14B.

Figure 5:
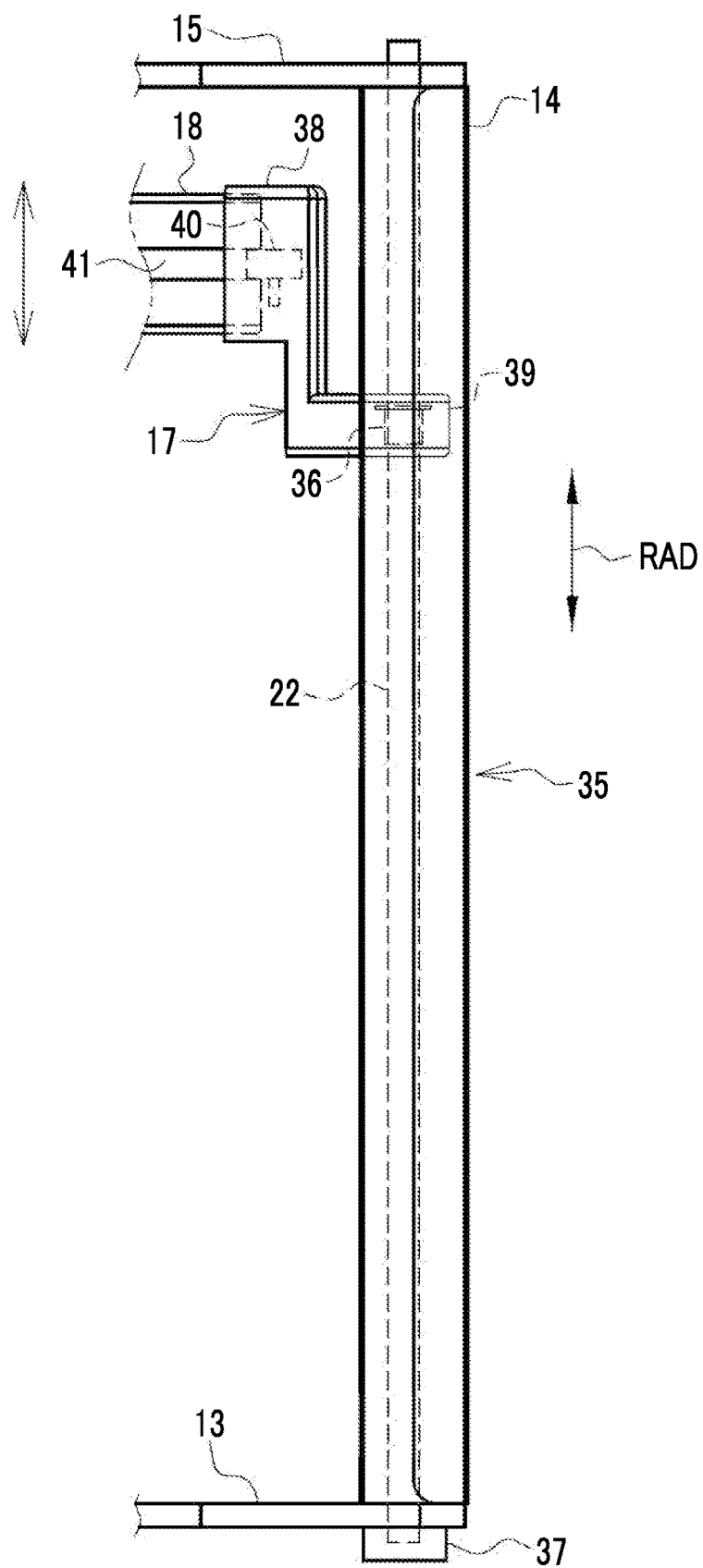
FIG. 5 is a diagram illustrating an elevating mechanism.

For example, as illustrated in FIG. 5, an elevating mechanism 35 that raises and lowers the connection member 17 and thus the frame 18 in the rotation axis direction RAD is a ball screw mechanism which is composed of the screw shaft 22, a nut 36 that has a ball provided therein and is engaged with the screw shaft 22, an elevating motor 37 that rotates the screw shaft 22, and the like. The elevating motor 37 is attached to the rear surface of the stage 13. The height position of the frame 18 is determined from the rotation direction and rotation speed of the elevating motor 37.

The connection member 17 has a first connection portion 38 that is connected to the frame 18 and a second connection portion 39 that is connected to the column 14. The first connection portion 38 protrudes toward the frame 18, and the second connection portion 39 protrudes toward the column 14. The connection member 17 has a Z-shape as a whole. A bearing 40 is provided in the first connection portion 38. The bearing 40 is fitted to a guide groove 41 (see also FIG. 1 and the like) that is formed over the entire circumference of the frame 18. The bearing 40 rolls as the frame 18 is rotated. The nut 36 is provided in the second connection portion 39.

Figure 6:
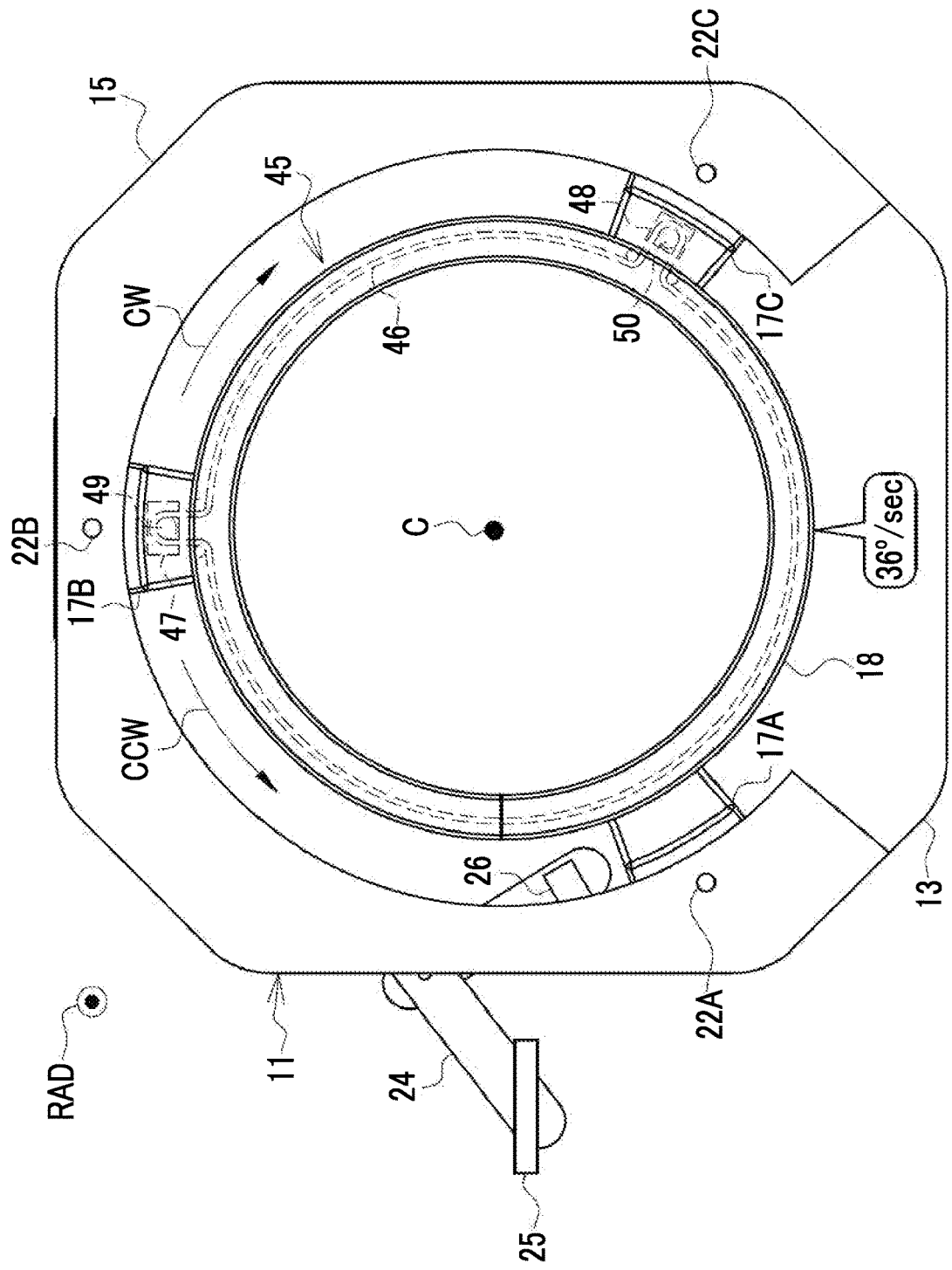
FIG. 6 is a diagram illustrating a rotation mechanism.

For example, as illustrated in FIG. 6, a rotation mechanism 45 that rotates the frame 18 and thus the imaging unit 30 around the body axis of the subject S is composed of a rotation belt 46 that is wound around the entire circumference of the frame 18, a rotary motor 47, a potentiometer 48, and the like. The rotary motor 47 is provided in the connection member 17B and is connected to a portion of the rotation belt 46 drawn out from the frame 18 through a pulley 49. The rotary motor 47 is driven to rotate the frame 18 and thus the imaging unit 30 in a clockwise (right-hand rotation) direction CW and a counterclockwise (left-hand rotation) direction CCW. The rotation speed of the imaging unit 30 is, for example, 36°/sec (second). In this case, the time required for the imaging unit 30 to make one rotation (360° rotation) is 10 sec. The clockwise direction CW and the counterclockwise direction CCW are examples of a "rotation direction" according to the technology of the present disclosure.

The potentiometer 48 is provided in the connection member 17C and is connected to a portion of the rotation belt 46 drawn out from the frame 18 through the pulley 50. The potentiometer 48 has a variable resistor whose resistance value is changed depending on the rotation position of the frame 18 and outputs a voltage signal corresponding to the rotation position of the frame 18. The rotation position of the frame 18 is determined by the voltage signal from the potentiometer 48. In addition, in FIG. 6, the imaging unit 30 is not illustrated in order to avoid complication.

Figure 7:
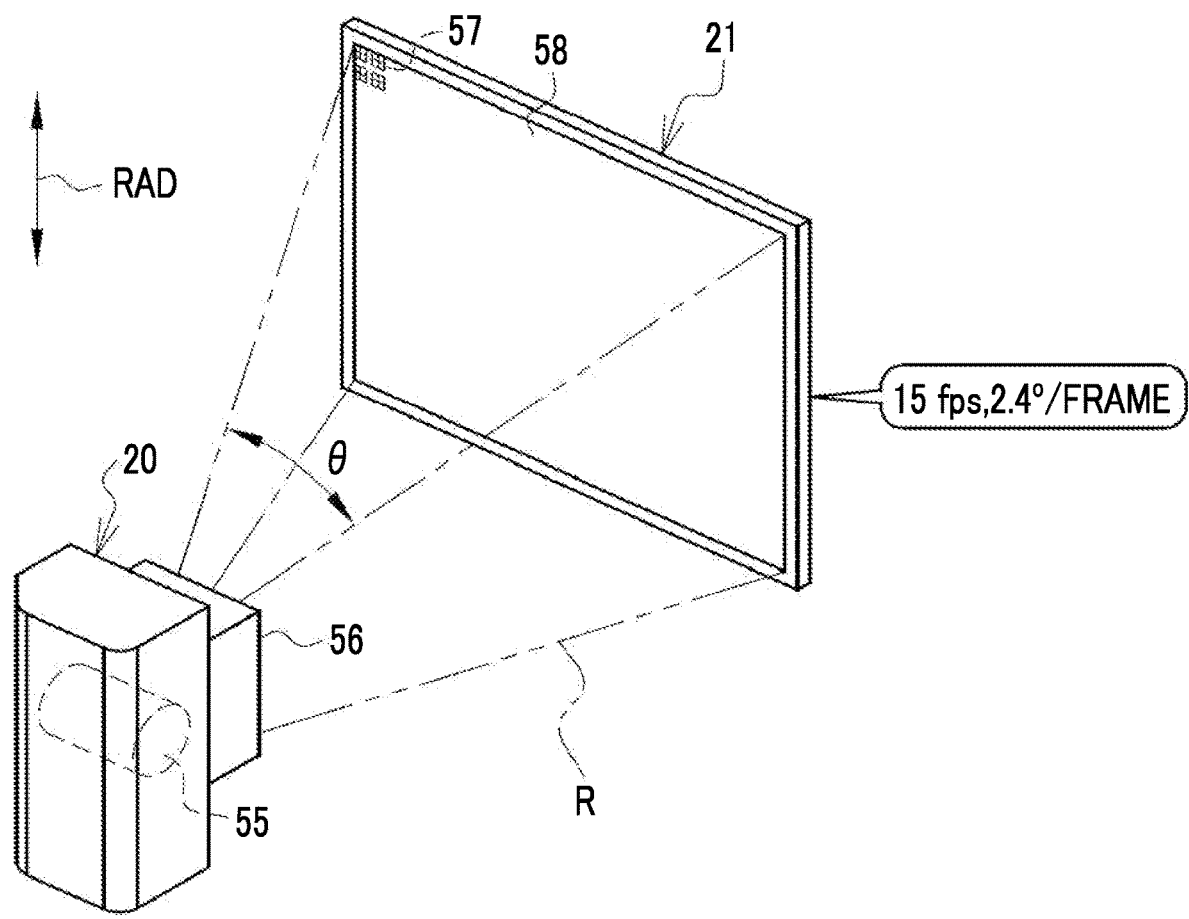
FIG. 7 is a perspective view illustrating a radiation source, a radiation detector, and radiation.

For example, as illustrated in FIG. 7, the radiation source 20 includes a radiation tube 55. The radiation tube 55 emits the radiation R. In addition, the radiation source 20 is also provided with an irradiation field lamp that emits, for example, orange visible light indicating an irradiation field of the radiation R, which is not illustrated.

The radiation source 20 has an irradiation field limiter 56. The irradiation field limiter 56 is also called a collimator and defines the irradiation field of the radiation R to the radiation detector 21. An incident opening through which the radiation R from the radiation tube 55 is incident and an exit opening through which the radiation R exits are formed in the irradiation field limiter 56. For example, four shielding plates are provided in the vicinity of the exit opening. The shielding plate is made of a material that shields the radiation R, for example, lead. The shielding plates are disposed on each side of a quadrangle, in other words, are assembled in a checkered pattern and form a quadrangular irradiation opening through which the radiation R is transmitted. The irradiation field limiter 56 changes the position of each shielding plate to change the size of the irradiation opening, thereby changing the irradiation field of the radiation R to the radiation detector 21. The radiation R having a quadrangular pyramid shape is emitted from the radiation source 20 by the operation of the irradiation field limiter 56. An emission angle θ of the radiation R as viewed from the rotation axis direction RAD is, for example, 10° to 30°. The emission angle θ is also called a cone angle.

The radiation detector 21 is composed of, for example, a scintillator that converts the radiation R into visible light, a thin film transistor (TFT) substrate having a detection surface 58 in which a plurality of pixels 57 that accumulate charge corresponding to the visible light to detect the radiation R are arranged in a two-dimensional matrix, a signal processing circuit that outputs a voltage signal corresponding to the charge as a projection image, and a housing that accommodates these components. The detection surface 58 has a size of, for example, 430 mm×430 mm (17 inches). A source-to-image distance (SID) which is a distance from the focus of the radiation R (a point at which the radiation R is emitted in the radiation tube 55) to the detection surface 58 is, for example, 1200 mm. In addition, the radiation detector 21 may be a type that directly detects the radiation R instead of the visible light converted from the radiation R.

The frame rate of the radiation detector 21 is, for example, 15 frames per second (fps). In a case in which the rotation speed of the imaging unit 30 is 36°/sec as described above, the radiation detector 21 outputs a projection image 125 (see FIG. 13) at every 2.4° (=36/15) (2.4°/frame). The angle of 2.4° is an example of an "angular interval" according to the technology of the present disclosure. The angular interval is determined by the frame rate of the radiation detector 21 and the rotation speed of the imaging unit 30 and defines the acquisition time of the projection image 125. The angular interval is the same for the first imaging unit 301 and the second imaging unit 302.

Figure 8:
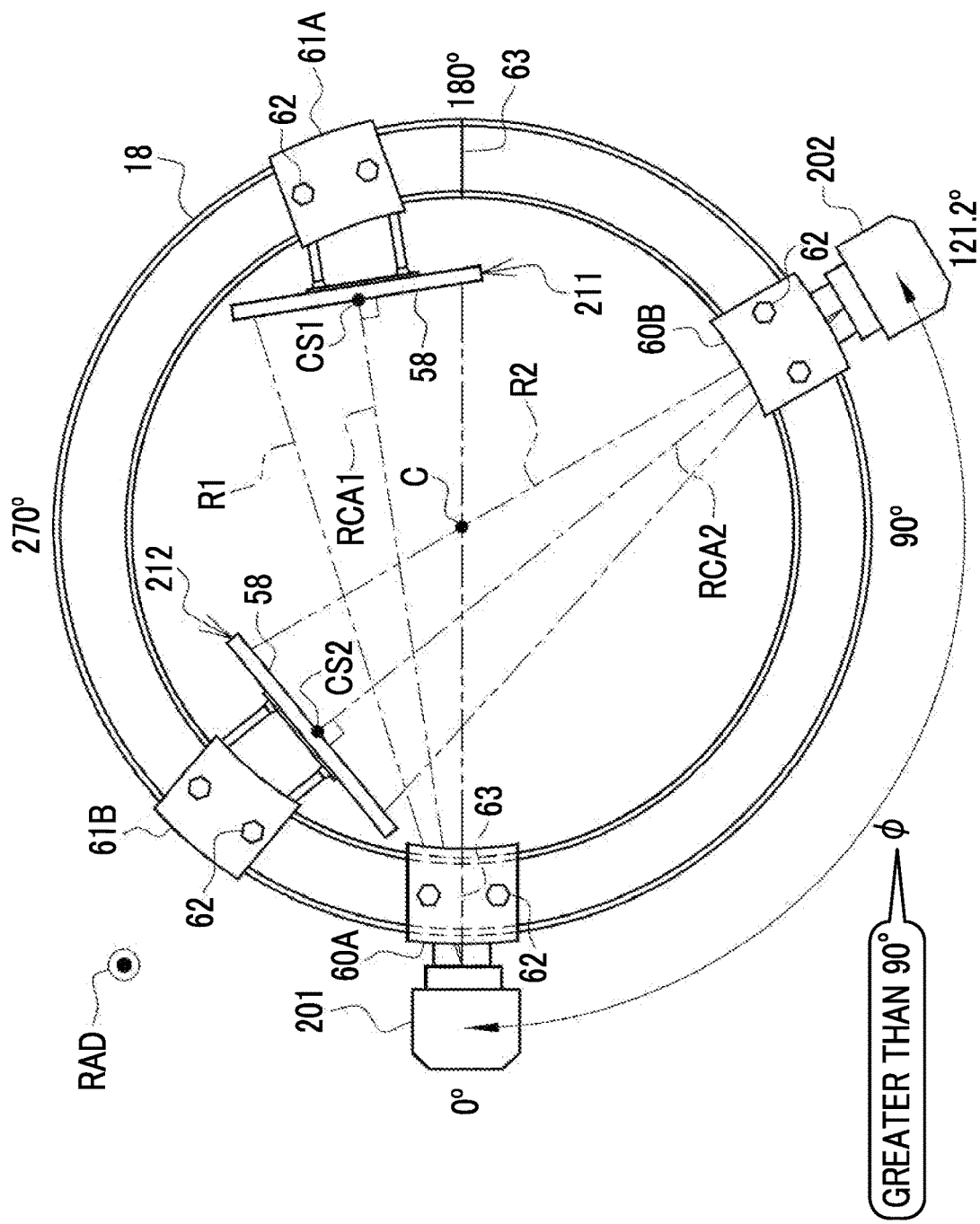
FIG. 8 is a diagram illustrating positions where a first imaging unit and a second imaging unit are disposed.

For example, as illustrated in FIG. 8, in a case in which the position where the first radiation source 201 is disposed is 0° and the positions of every 90° in the counterclockwise direction CCW are 90°, 180°, and 270° as viewed from the rotation axis direction RAD, the second radiation source 202 is disposed at a position that is separated from the first radiation source 201 by an angle φ that is greater than 90°. The first radiation detector 211 and the second radiation detector 212 are disposed at positions corresponding to the positions where the first radiation source 201 and the second radiation source 202 are disposed. Therefore, the first imaging unit 301 and the second imaging unit 302 have different phases in the rotation direction. In addition, in this example, φ is 121.2°.

First radiation R1 which is the radiation R from the first radiation source 201 and second radiation R2 which is the radiation R from the second radiation source 202 intersect with each other in the vicinity of the rotation center C of the frame 18. A first central axis RCA1 of a flux of the first radiation R1 perpendicularly intersects a first center point CS1 of the detection surface 58 of the first radiation detector 211. Similarly, a second central axis RCA2 of a flux of the second radiation R2 perpendicularly intersects a second center point CS2 of the detection surface 58 of the second radiation detector 212. Further, in the following description, the first central axis RCA1 and the second central axis RCA2 are collectively referred to as central axes RCA in a case in which they do not need to be distinguished from each other. In addition, the first center point CS1 and the second center point CS2 are collectively referred to as center points CS.

The first radiation source 201 and the second radiation source 202 are attached to the frame 18 by attachments 60A and 60B, respectively. Similarly, the first radiation detector 211 and the second radiation detector 212 are attached to the frame 18 by attachments 61A and 61B, respectively. The attachments 60A, 60B, 61A, and 61B are fixed to the frame 18 by bolts 62. The radiation source 20 is disposed outside the frame 18, and the radiation detector 21 is disposed inside the frame 18 as viewed from the rotation axis direction RAD.

The frame 18 is formed by joining two semi-annular members by, for example, welding. The attachment 60A is attached to cover one of two opposing joint portions 63 of the frame 18. This attachment of the attachment 60A to the joint portion 63 makes it possible to reinforce the joint portion 63, which is a mechanically weak portion, with the attachment 60A.

Figure 9:
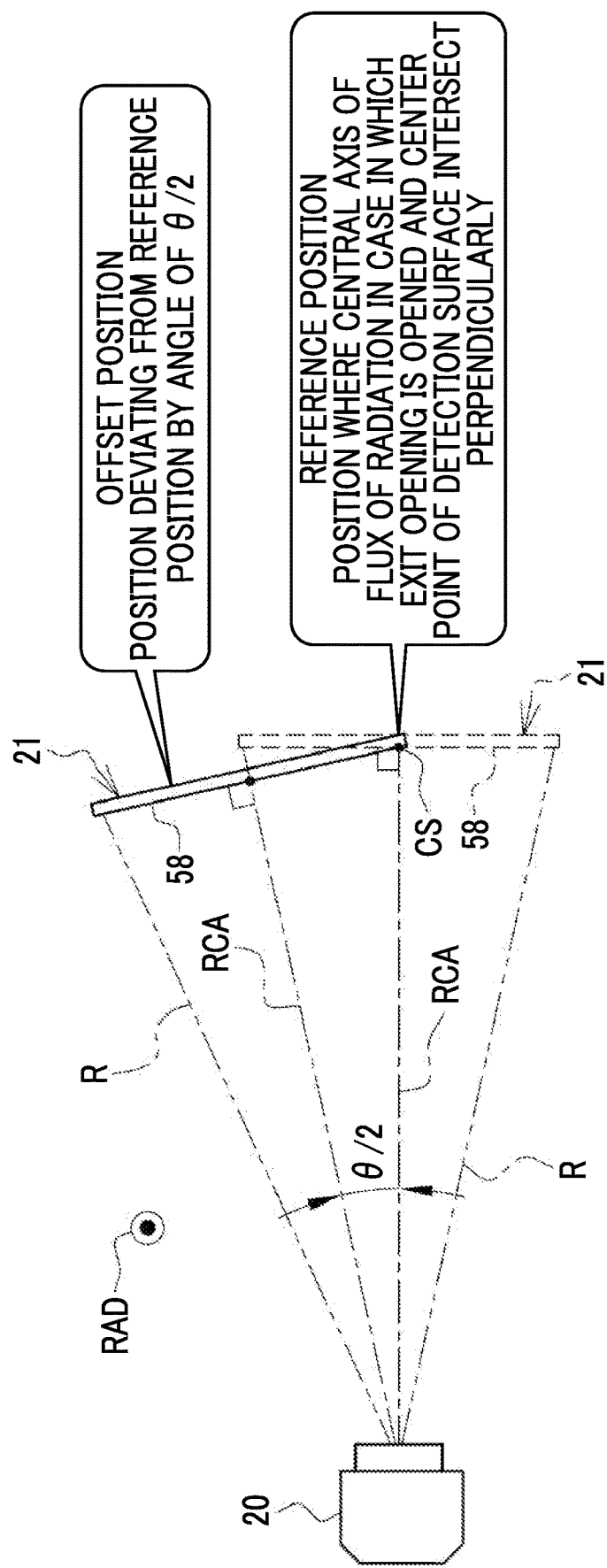
FIG. 9 is a diagram illustrating a reference position and an offset position of the radiation detector.

For example, as illustrated in FIG. 9, the radiation detector 21 is disposed at an offset position that is separated from a reference position facing the radiation source 20 by a preset angle as viewed from the rotation axis direction RAD. Here, the reference position is a position where the central axis RCA of a flux of the radiation R in a case in which the exit opening of the irradiation field limiter 56 is opened to the maximum and the center point CS of the detection surface 58 of the radiation detector 21 intersect perpendicularly. The preset angle at the offset position is half (θ/2) of the emission angle θ in this example.

Figure 10:
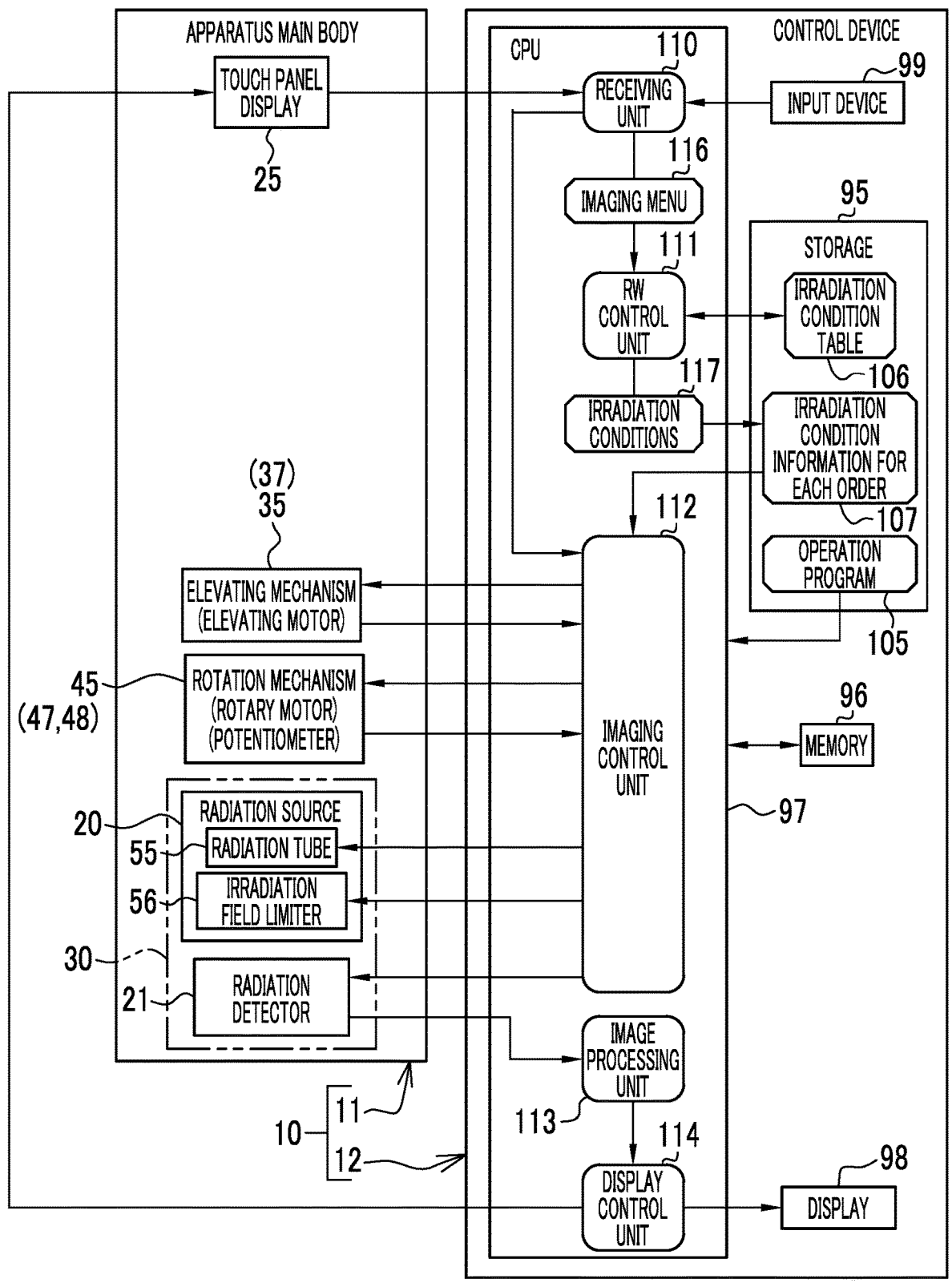
FIG. 10 is a block diagram illustrating a processing unit of a CPU of a control device.

For example, as illustrated in FIG. 10, a computer constituting the control device 12 comprises a storage 95, a memory 96, a central processing unit (CPU) 97, a display 98, an input device 99, and the like.

The storage 95 is a hard disk drive that is provided in the computer constituting the control device 12 or is connected to the computer through a cable or a network. Alternatively, the storage 95 is a disk array in which a plurality of hard disk drives are connected. The storage 95 stores, for example, a control program, such as an operating system, various application programs, and various types of data associated with these programs. In addition, a solid state drive may be used instead of the hard disk drive.

The memory 96 is a work memory for the CPU 97 to perform processes. The CPU 97 loads the program stored in the storage 95 to the memory 96 and performs a process corresponding to the program. Therefore, the CPU 97 controls the overall operation of each unit of the computer. The CPU 97 is an example of a "processor" according to the technology of the present disclosure. In addition, the memory 96 may be provided in the CPU 97.

The display 98 displays various screens. The various screens have operation functions by a graphical user interface (GUI). The computer constituting the control device 12 receives operation instructions input from the input device 99 through various screens. The input device 99 is, for example, a keyboard, a mouse, a touch panel, a microphone for voice input.

An operation program 105 is stored in the storage 95. The operation program 105 is an application program for causing the computer to function as the control device 12. The storage 95 stores, for example, an irradiation condition table 106 and irradiation condition information 107 for each order, in addition to the operation program 105.

In a case in which the operation program 105 is started, the CPU 97 of the control device 12 functions as a receiving unit 110, a read and write (hereinafter, abbreviated to RW) control unit 111, an imaging control unit 112, an image processing unit 113, and a display control unit 114 in cooperation with, for example, the memory 96.

The receiving unit 110 receives various operation instructions input by the operator through the touch panel display 25 of the apparatus main body 11 and the input device 99. For example, the receiving unit 110 receives an imaging menu 116. The receiving unit 110 outputs the imaging menu 116 to the RW control unit 111.

The RW control unit 111 receives the imaging menu 116 from the receiving unit 110. The RW control unit 111 reads irradiation conditions 117 of the radiation R which correspond to the received imaging menu 116 from the irradiation condition table 106. The RW control unit 111 writes the irradiation conditions 117 read from the irradiation condition table 106 to the irradiation condition information 107 for each order.

The imaging control unit 112 controls the operations of the radiation source 20 (the radiation tube 55 and the irradiation field limiter 56), the elevating mechanism 35 (elevating motor 37), the rotation mechanism 45 (the rotary motor 47 and the potentiometer 48), and the radiation detector 21. The imaging control unit 112 reads the irradiation conditions 117 from the irradiation condition information 107 for each order. The imaging control unit 112 drives the irradiation field limiter 56 according to the irradiation conditions 117 to adjust the irradiation field. The operator inputs an imaging instruction to the control device 12 through an irradiation switch (not illustrated). In a case in which the imaging instruction is input, the imaging control unit 112 drives the radiation tube 55 according to the irradiation conditions 117 such that the radiation tube 55 generates the radiation R. The imaging control unit 112 outputs the projection image 125 obtained by the detection of the emitted radiation R by the radiation detector 21 from the radiation detector 21 to the image processing unit 113.

The image processing unit 113 receives the projection image 125 from the radiation detector 21. The image processing unit 113 performs various types of image processing on the projection image 125. Further, the image processing unit 113 performs a reconstruction process on a plurality of projection images 125 subjected to the image processing to generate a tomographic image. The image processing unit 113 outputs the tomographic image to the display control unit 114.

The display control unit 114 controls the display of various types of information on the touch panel display 25 and the display 98. The display control unit 114 receives the tomographic image from the image processing unit 113. The display control unit 114 displays the tomographic image on the touch panel display 25 and the display 98.

The imaging menu 116 includes, for example, imaging order identification data (ID) and an imaging technique. The imaging order ID is identification information of an imaging order issued by a doctor who makes a diagnosis using the tomographic image. The imaging technique is composed of a posture of the subject S, such as a standing posture or a sitting posture, an imaging part, such as the head, the neck, or the entire spine, and attributes of the subject S such as an adult male, an adult female, and a child.

The imaging order is transmitted from a radiology information system (RIS) (not illustrated) to the control device 12. The control device 12 displays a list of imaging orders on the display 98 under the control of the display control unit 114. The operator browses the list of the imaging orders and checks the content of the list. Then, the control device 12 displays the imaging menu corresponding to the imaging order on the display 98 such that it can be set. The operator operates the input device 99 to select the imaging menu corresponding to the imaging order and to input the imaging menu.

The irradiation conditions 117 are registered in the irradiation condition table 106 for each imaging technique. The irradiation conditions 117 include a tube voltage and a tube current applied to the radiation tube 55 and the irradiation time of the radiation R. In addition, the irradiation conditions 117 also include the size of the irradiation field. The operator can finely adjust the irradiation conditions 117 by hand. Further, instead of the tube current and the irradiation time, a tube current-irradiation time product, that is, a so-called mAs value may be set as the irradiation condition 117.

The irradiation conditions 117 for each imaging order ID is registered in the irradiation condition information 107 for each order. The imaging control unit 112 reads the irradiation condition 117 corresponding to an imaging order ID of the next imaging from the irradiation condition information 107 for each order and controls the operation of each unit according to the read irradiation conditions 117.

Figure 11:
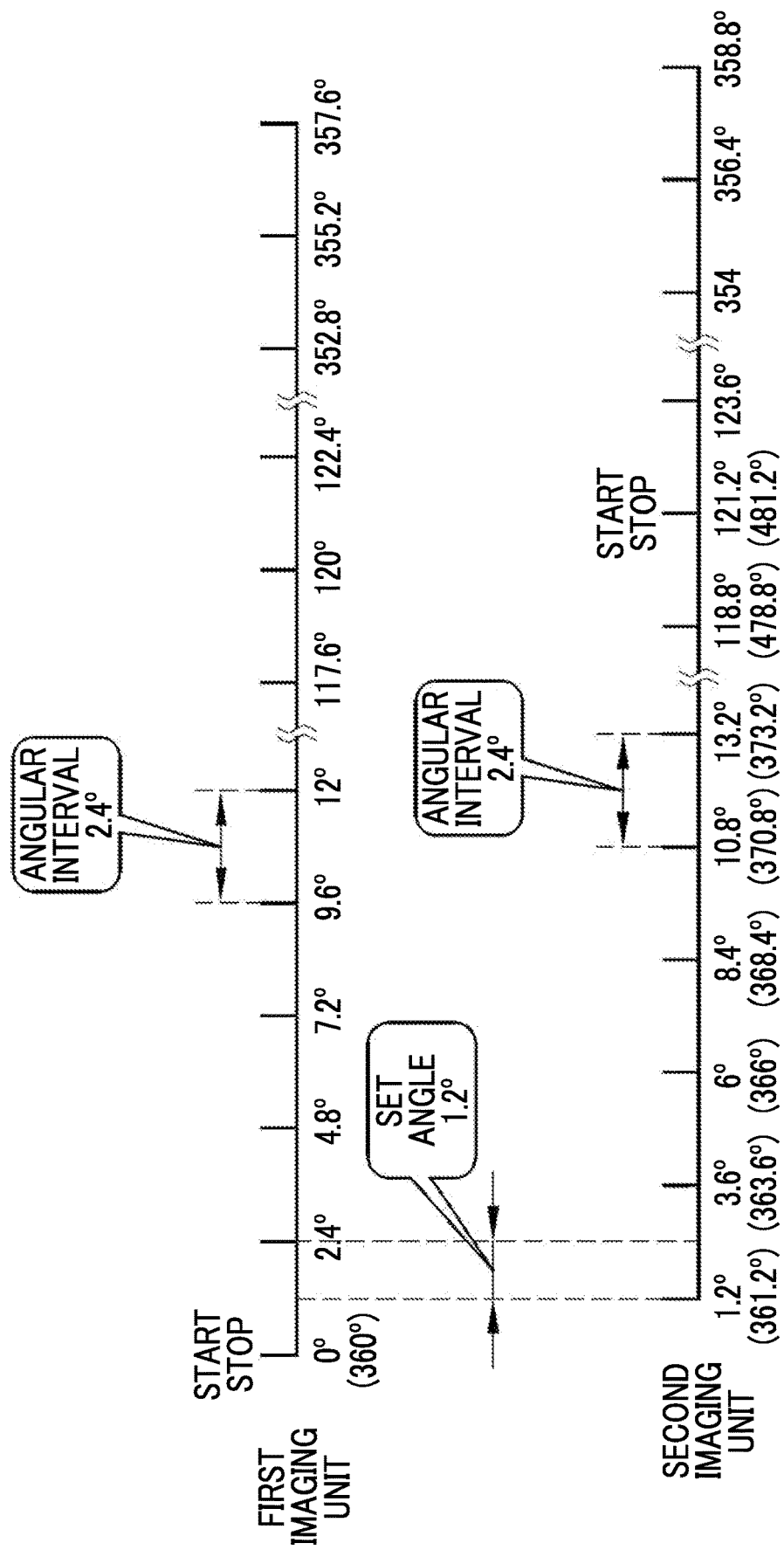
FIG. 11 is a diagram illustrating positions where the first imaging unit and the second imaging unit acquire projection images.

For example, as illustrated in FIG. 11, the first imaging unit 301 outputs the projection image 125 at an angular interval of 2.4°, for example, at 2.4°, 4.8°, 7.2°, . . . , 117.6°, 120°, 122.4°, . . . , 352.8°, 355.2°, and 357.6°, using 0° at which the first radiation source 201 is disposed as a rotation start position and a rotation end position. The second imaging unit 302 outputs the projection image 125 at an angular interval of 2.4°, for example, at 123.6°, . . . , 354°, 356.4°, 358.8°, 1.2° (361.2°), 3.6° (363.6°), 6° (366°), . . . , using 121.2° at which the second radiation source 202 is disposed as the rotation start position and the rotation end position. In addition, strictly speaking, the rotation end position is a position that is separated from 0° and 121.2° by an angle of θ in the counterclockwise direction CCW.

In the first imaging unit 301 and the second imaging unit 302, since the second radiation source 202 is disposed at a position of 121.2°, the acquisition positions of the projection images 125 are separated from each other by 1.2° that is half of the angular interval of 2.4°. In other words, the first imaging unit 301 and the second imaging unit 302 are disposed such that the acquisition positions of the projection images 125 are separated from each other by 1.2°. Therefore, the second imaging unit 302 can acquire the projection images 125 at positions of 1.2° between 0° and 2.4°, 3.6° between 2.4° and 4.8°, . . . , 354° between 352.8° and 355.2°, and 356.4° between 355.2° and 357.6° which are not captured by the first imaging unit 301. That is, the second imaging unit 302 can interpolate the positions where images are not captured by the first imaging unit 301 and perform imaging.

1.2° is an example of a "set angle" according to the technology of the present disclosure. The set angle is an angle that is less than the angular interval. Here, the set angle is an angle obtained by equally dividing the angular interval. Further, in this embodiment, the term "equal division" means equal division including an error that is generally allowed in the technical field to which the technology of the present disclosure belongs and does not deviate from the gist of the technology of the present disclosure, in addition to exactly equal division. The allowable error is an error that does not cause any problem in the reconstruction process in a case in which the reconstruction process is performed on the projection images 125 to generate a tomographic image. Specifically, the allowable error is an error within the size (for example, 0.15 mm) of one pixel 57. In addition, in a case in which binning readout that collectively reads charge of a plurality of adjacent pixels 57 is performed, the allowable error is an error within the size of the plurality of pixels 57. For example, in a case in which binning readout that collectively reads charge of four (2×2) pixels 57 is performed, the allowable error is an error within the size of two pixels 57 (for example, 0.15×2=0.3 mm).

Figure 12:
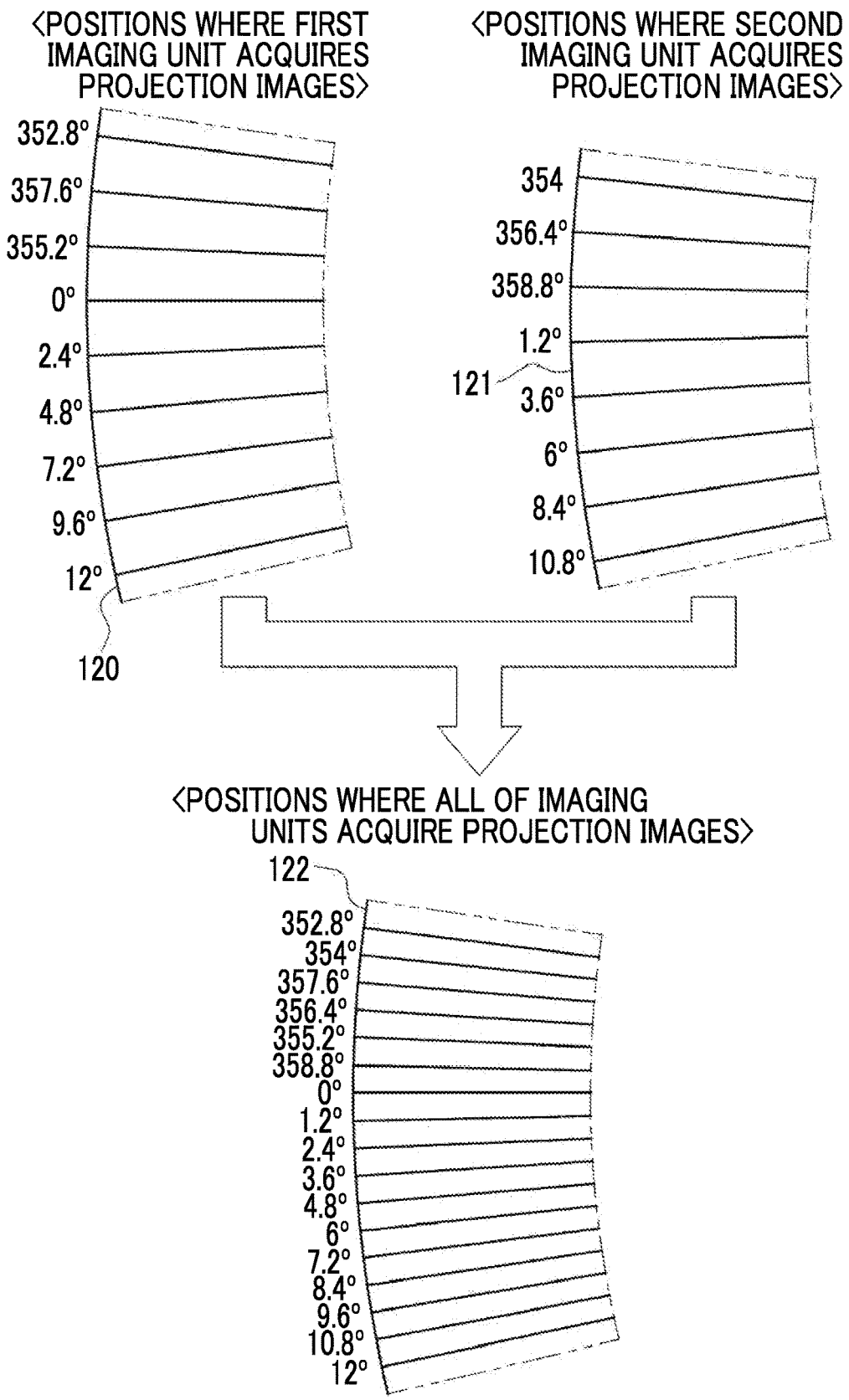
FIG. 12 is a diagram illustrating positions where the first imaging unit, the second imaging unit, and all of the imaging units acquire the projection images.

For example, as illustrated in FIG. 12, a fan shape represented by reference numeral 120 indicates some of the positions where the first imaging unit 301 acquires the projection images 125. On the other hand, a fan shape represented by reference numeral 121 indicates some of the positions where the second imaging unit 302 acquires the projection images 125. A fan shape represented by reference numeral 122 indicates some of the positions where all of the imaging units 30 including the first imaging unit 301 and the second imaging unit 302 acquire the projection images 125. Since the positions where the first imaging unit 301 and the second imaging unit 302 acquire the projection images 125 are separated from each other by 1.2° which is the set angle, the number of positions where all of the imaging units 30 acquire the projection images 125 is twice the number of positions where one imaging unit 30 acquires the projection images 125. Therefore, the frame rate of the radiation detector 21 is substantially 30 fps.

Figure 13:
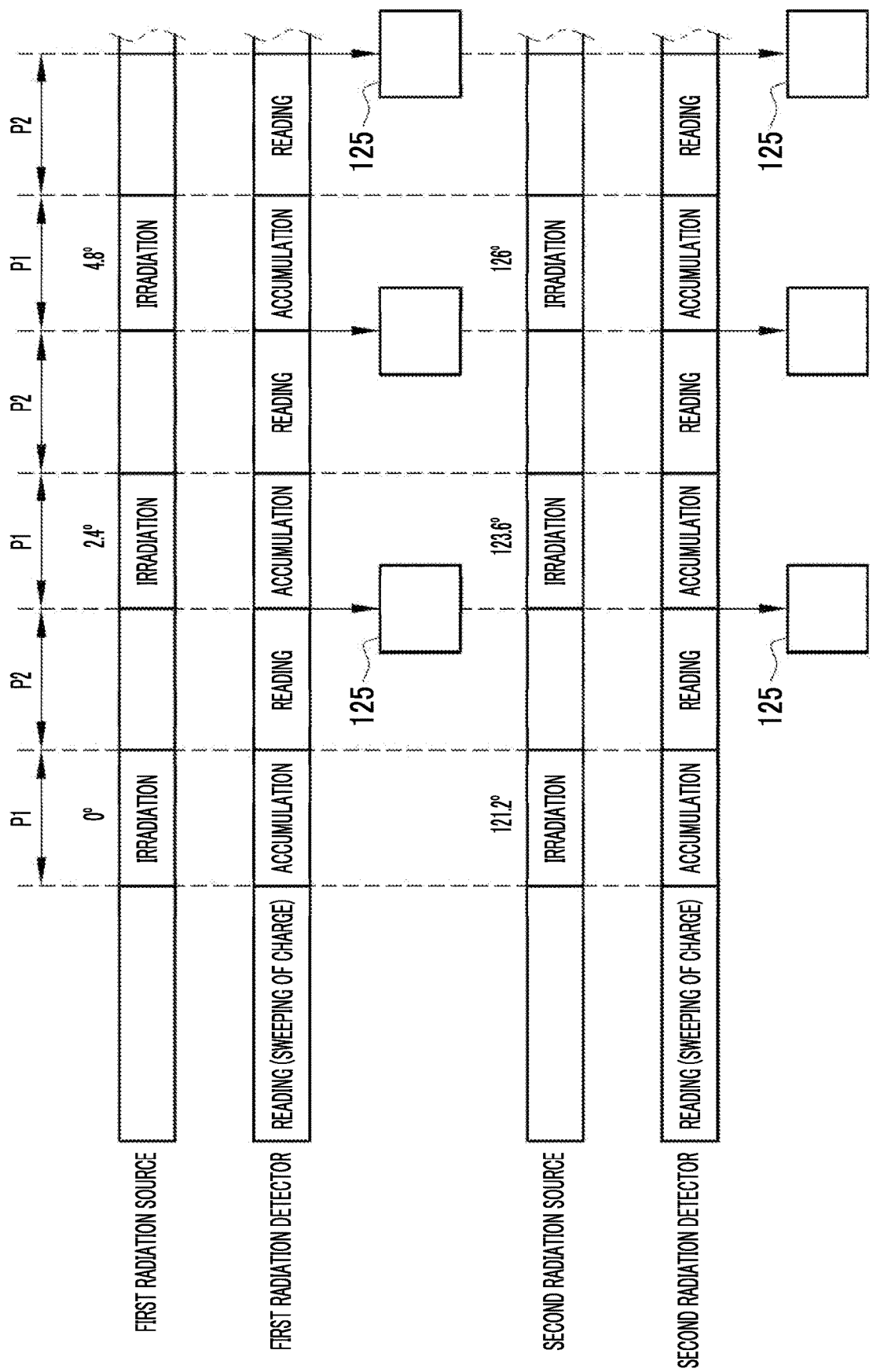
FIG. 13 is a timing chart illustrating the time when the radiation source emits the radiation and the time when the radiation detector reads the projection image.

FIG. 13 is an example of a timing chart illustrating the time when the radiation source 20 emits the radiation R and the time when the radiation detector 21 reads the projection image 125. The imaging control unit 112 directs the first radiation detector 211 and the second radiation detector 212 to perform a reading operation before imaging. This reading operation is an operation of sweeping out unnecessary charge, such as dark charge, accumulated in the pixel 57 during standby and is also called a reset operation.

After directing the first radiation detector 211 and the second radiation detector 212 to perform the reading operation of sweeping out unnecessary charge, the imaging control unit 112 directs the first radiation source 201 and the second radiation source 202 to emit the first radiation R1 and the second radiation R2 under the same irradiation conditions during a preset first period P1. In addition, the imaging control unit 112 directs the first radiation detector 211 and the second radiation detector 212 to perform an accumulation operation during the first period P1. The accumulation operation is an operation of accumulating charge based on the first radiation R1 and charge based on the second radiation R2 in the pixel 57. The maximum value of the irradiation time of the radiation R is set as the length of the first period P1.

The imaging control unit 112 directs the first radiation detector 211 and the second radiation detector 212 to perform the reading operation and directs the first radiation detector 211 and the second radiation detector 212 to output the projection images 125 during the subsequent second period P2. The time required for the reading operation is set as the length of the second period P2.

The imaging control unit 112 directs the first radiation source 201 and the second radiation source 202 to emit the first radiation R1 and the second radiation R2 at the same time during the first period P1. In addition, the imaging control unit 112 directs the first radiation detector 211 and the second radiation detector 212 to output the projection images 125 at the same time during the second period P2. Further, the term "same" in the same time means the same including an error which is generally allowed in the technical field to which the technology of the present disclosure belongs and is not contrary to the gist of the technology of the present disclosure, in addition to exactly the same. Here, since the imaging unit 30 is rotated, there is a slight deviation between the position of the imaging unit 30 in a case in which the emission of the radiation R is started and the position of the imaging unit 30 in a case in which the emission of the radiation R is ended. However, it is assumed that the position of the imaging unit 30 in which the emission of the radiation R is started is the acquisition position of the projection image 125. In addition, after the rotation of the frame 18 is temporarily stopped at an angular interval of 1.2°, for example, at 0°, 1.2°, 2.4°, 3.6°, 4.8°, . . . , the radiation R may be emitted from the radiation source 20.

Figure 14:
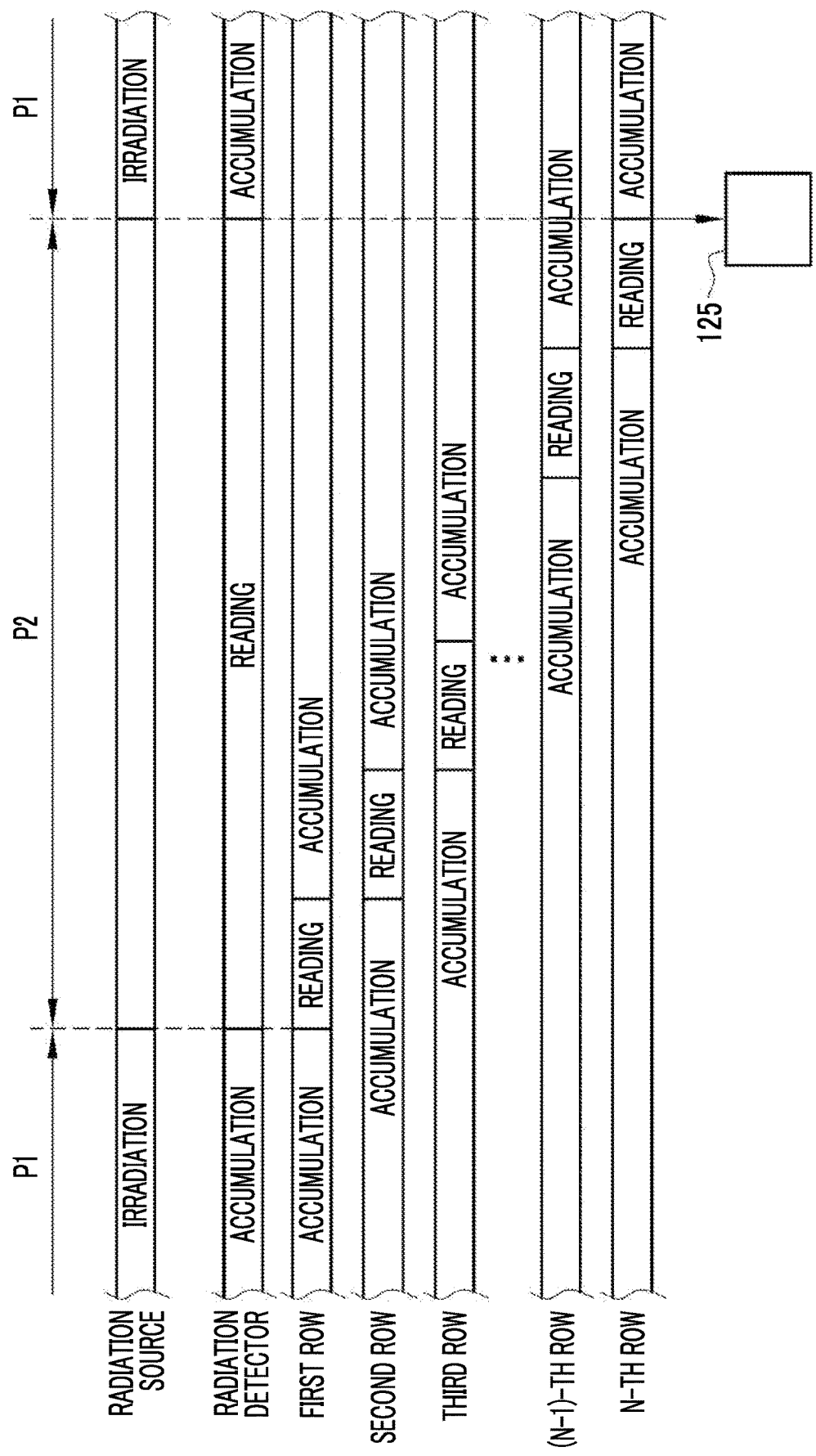
FIG. 14 is a timing chart illustrating details of a projection image reading operation of the radiation detector.

FIG. 14 illustrates details of the reading operation of the projection image 125 by the radiation detector 21 during the second period P2. The radiation detector 21 sequentially reads the charge accumulated in the pixels 57 by the accumulation operation row by row from a first row to an N-th row (N is a natural number equal to or greater than 2 and is, for example, 2836). A period from the reading start time of the pixels 57 in the first row to the reading end time of the pixels 57 in the N-th row is the period of the reading operation illustrated in FIG. 13. Further, a period from the accumulation start time of the pixels 57 in the N-th row to the accumulation end time of the pixels 57 in the first row is the period of the accumulation operation illustrated in FIG. 13. The start time and the end time of the accumulation operation are different for each row, but the time required for the accumulation operation (charge accumulation time) is the same for each row.

Figure 15:
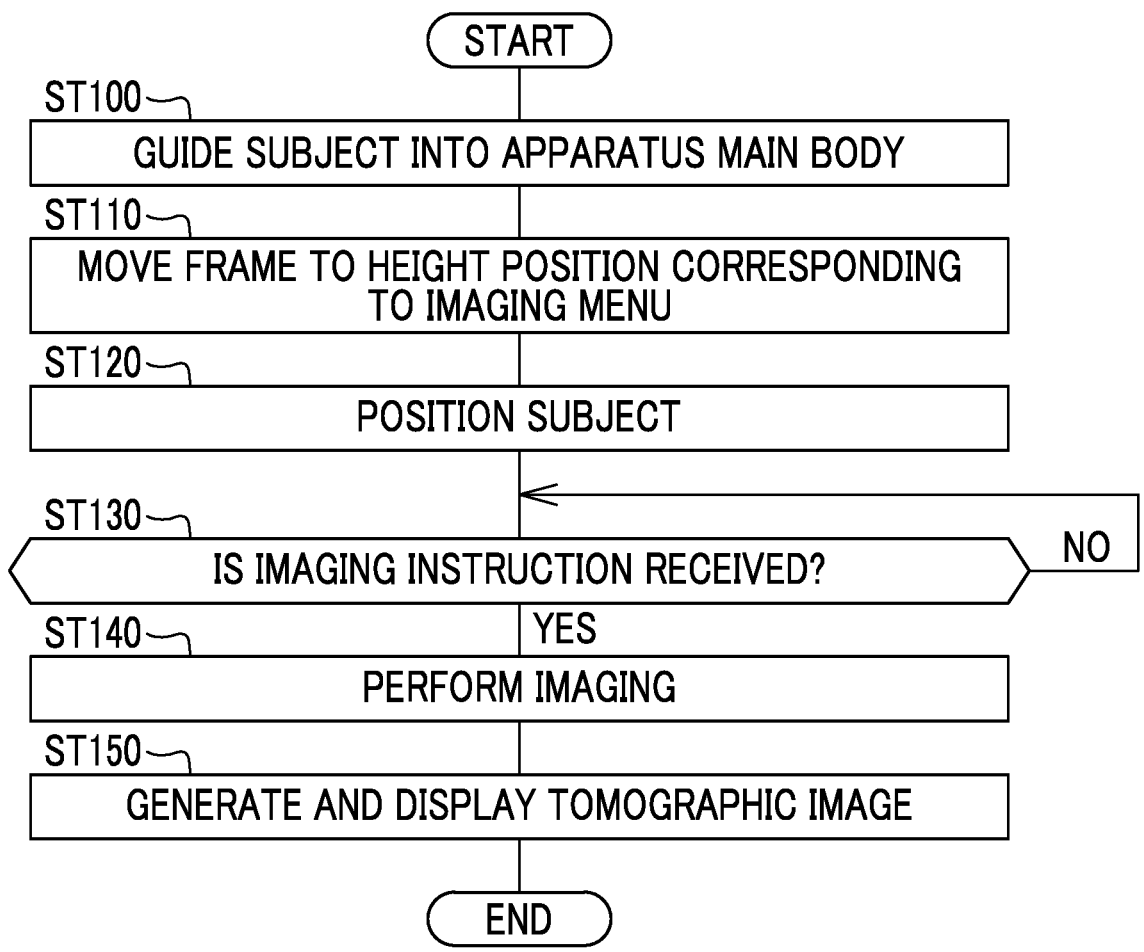
FIG. 15 is a flowchart illustrating an imaging procedure by the CT apparatus.

Next, an example of an imaging procedure by the CT apparatus 10 will be described with reference to a flowchart illustrated in FIG. 15. First, the subject S is guided into the apparatus main body 11 by the operator (Step ST100). Then, the elevating mechanism 35 is operated under the control of the imaging control unit 112 to move the frame 18 to a height position corresponding to the imaging menu 116 (Step ST110). Then, the operator positions the subject S (Step ST120). In this case, an irradiation field lamp that is provided in the radiation source 20 is turned on as necessary, and the operator determines whether or not the height position of the frame 18 and the positioning of the subject S are appropriate for imaging. In a case in which the height position of the frame 18 and the positioning of the subject S are not appropriate for imaging, the operator adjusts the height position of the frame 18 or repositions the subject S. In a case in which the height position of the frame 18 and the positioning of the subject S are appropriate for imaging, the operator inputs an imaging instruction through the irradiation switch. The imaging instruction is received by the receiving unit 110 (YES in Step ST130). Then, imaging is performed by the imaging unit 30 (Step ST140).

In the imaging, the rotation mechanism 45 is operated under the control of the imaging control unit 112 to rotate the frame 18 by, for example, 360° in the counterclockwise direction CCW. In the meantime, under the control of the imaging control unit 112, the radiation source 20 continuously emits the radiation R under the same irradiation conditions, and the radiation detector 21 outputs the projection image 125 whenever the radiation R is emitted. Specifically, the first radiation source 201 and the second radiation source 202 emit the first radiation R1 and the second radiation R2 at the same time, and the first radiation detector 211 and the second radiation detector 212 output the projection images 125 at the same time.

After the imaging is ended, the image processing unit 113 generates a tomographic image from the obtained projection images 125 (Step ST150). Then, under the control of the display control unit 114, the tomographic image is displayed on, for example, the display 98 and is provided for viewing by the operator (Step ST150).

As described above, the CT apparatus 10 comprises the plurality of imaging units 30, the rotation mechanism 45, and the CPU 97. The imaging unit 30 is composed of the radiation source 20 that emits the radiation R having a quadrangular pyramid shape toward the subject S and the radiation detector 21 in which a plurality of pixels 57 detecting the radiation R transmitted through the subject S are two-dimensionally arranged. The rotation mechanism 45 rotates the plurality of imaging units 30 around the body axis of the subject S while maintaining the disposition interval. The imaging control unit 112 of the CPU 97 controls the operations of the plurality of imaging units 30 and the rotation mechanism 45. The angular interval that is determined by the frame rate of the radiation detector 21 and the rotation speed of the imaging unit 30 and defines the acquisition time of the projection image 125 based on the radiation R is the same for the plurality of imaging units 30. The plurality of imaging units 30 have different phases in the rotation direction, and the positions where the plurality of imaging units 30 acquire the projection images 125 are separated from each other by a set angle that is less than the angular interval. Therefore, it is possible to increase the angular resolution of the projection image 125 without increasing the frame rate of the radiation detector 21 or reducing the rotation speed of the imaging unit 30.

FIG. 16 illustrates a case in which the position of the second radiation source 202 is not 121.2° according to this example, but is 120°, that is, a case in which the positions where the plurality of imaging units 30 acquire the projection images 125 are not separated from each other by the set angle. In this case, as represented by the fan shapes 120 and 121, the positions where the first imaging unit 301 and the second imaging unit 302 acquire the projection images 125 are the same. Therefore, as represented by the fan shape 122, the number of positions where all of the imaging units 30 acquire the projection images 125 is half of the number of positions in the case of this example illustrated in FIG. 12. As a result, it has been confirmed that the angular resolution of the projection image 125 can be increased by the technology of the present disclosure.

As illustrated in FIG. 7, the radiation source 20 emits the radiation R having a quadrangular pyramid shape, and the radiation detector 21 has the configuration in which the plurality of pixels 57 detecting the radiation R are two-dimensionally arranged. Therefore, it is possible to complete imaging in a short time, as compared to the CT apparatus according to the related art in which a radiation source emits the radiation R having a fan shape and a radiation detector in which pixels are one-dimensionally arranged detects the radiation R. In addition, the radiation R having a conical shape instead of the quadrangular pyramid shape may be emitted.

The set angle is an angle obtained by equally dividing the angular interval. Therefore, there is no angular bias between the acquisition positions of the projection images 125, which makes it easy to generate a tomographic image from the projection images 125.

As illustrated in FIG. 13, the imaging control unit 112 directs all of the plurality of imaging units 30 to emit the radiation R during the preset first period P1 and directs all of the plurality of imaging units 30 to output the projection images 125 during the preset second period P2 following the first period P1. Therefore, it is possible to complete imaging in a short time as compared to a case in which the plurality of imaging units 30 sequentially perform imaging. It is possible to reduce the burden on the subject S, and it is also possible to reduce the concern that the quality of the tomographic image will deteriorate due to the body movement of the subject S.

Further, as illustrated in FIG. 13, the imaging control unit 112 directs the plurality of imaging units 30 to emit the radiation R at the same time during the first period P1 and directs the plurality of imaging units 30 to output the projection images 125 at the same time during the second period P2. Therefore, it is possible to acquire the projection images 125 having the same quality with the plurality of imaging units 30. In addition, it is possible to suppress the occurrence of banding artifacts in the projection images 125, which will be described below in FIG. 25.

Figure 17:
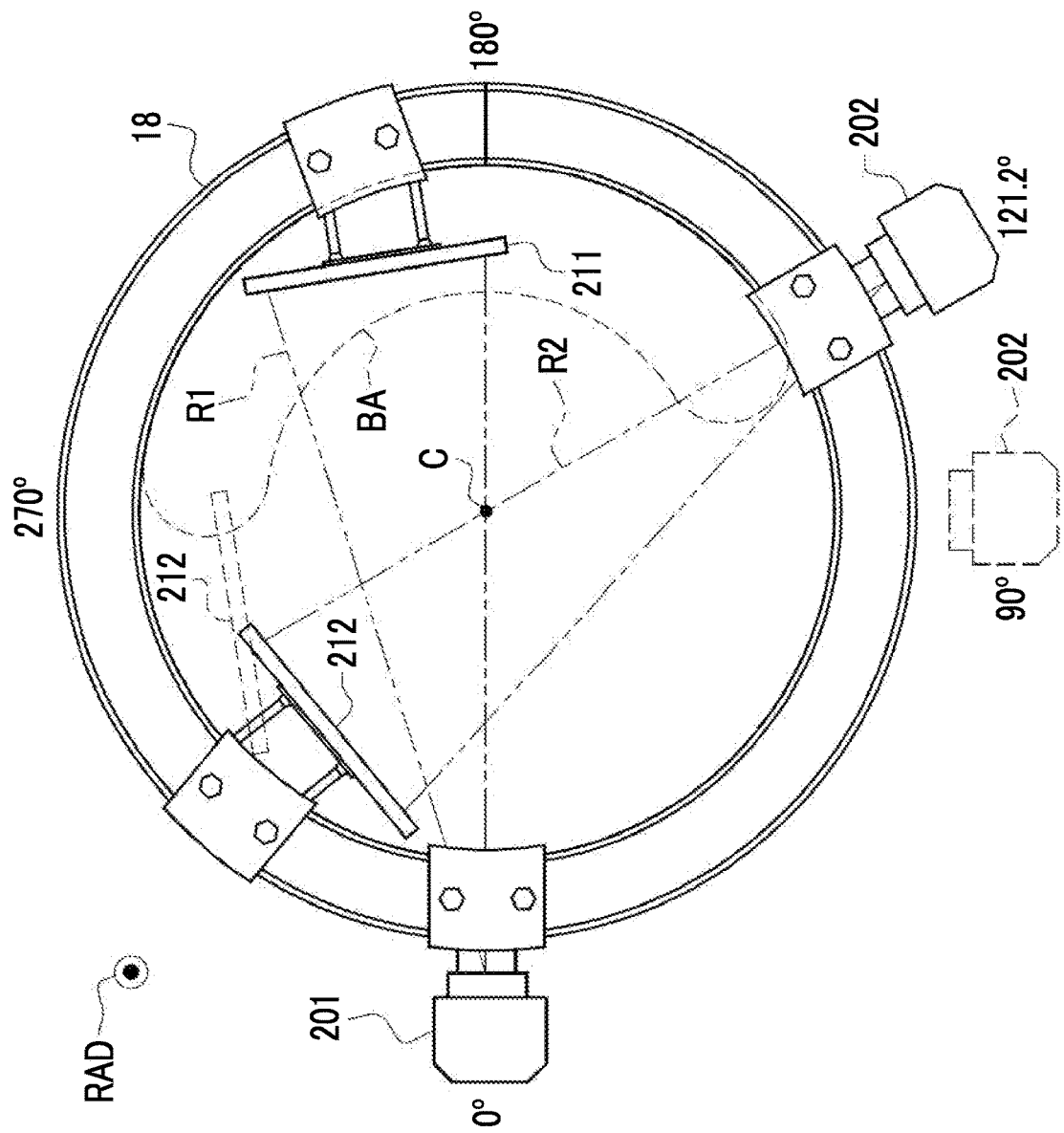
FIG. 17 is a diagram illustrating an effect of disposing the second imaging unit at a position that is separated from the first imaging unit by an angle that is greater than 90°.

As illustrated in FIG. 8, the plurality of imaging units 30 are disposed at the positions that are separated by an angle φ that is greater than 90° as viewed from the rotation axis direction RAD. Therefore, for example, as illustrated in FIG. 17, the second radiation detector 212 can be disposed at a position avoiding a region BA which is particularly strongly affected by backscattered rays of the first radiation R1.

In a case in which the angle φ is equal to or less than 90°, for example, in a case in which the angle φ is 90°, the end of the second radiation detector 212 enters the region BA as represented by a broken line. Then, in this example, since the first radiation R1 and the second radiation R2 are emitted at the same time, components caused by the backscattered rays of the first radiation R1 are included as noise in the projection image 125 obtained by the second radiation detector 212. However, in this example, since the plurality of imaging units 30 are disposed at the positions that are separated by an angle φ that is greater than 90°, it is possible to reduce the concern that the components caused by the backscattered rays of the first radiation R1 will be included as noise in the projection image 125 obtained by the second radiation detector 212. The backscattered rays referred to here are scattered rays caused by the disposition of the radiation source 20 and the radiation detector 21. However, since the radiation detector 212 is disposed at the position avoiding the region BA, it is also possible to reduce the influence of scattered rays caused by the subject S.

In addition, for example, a grid may be provided in front of the radiation detector 21 to reduce the influence of the scattered rays. Alternatively, for example, the technique described in JP6006193B that achieves the same image quality improvement effect as that in a case in which a grid is used with image processing, without actually using the grid may be applied.

There is an upper limit to the angle φ. For example, as in a case illustrated in FIG. 18 in which the angle φ is 125°, the end of the second radiation detector 212 should not be included in the projection image 125 obtained by the first imaging unit 301. Therefore, it is preferable that the angle φ is greater than 90° and is equal to or less than a limit angle at which the end of the second radiation detector 212 is included in the projection image 125 obtained by the first imaging unit 301. In addition, φ is not limited to 121.2° that is given as an example and may be, for example, 91.2°.

Figure 18:
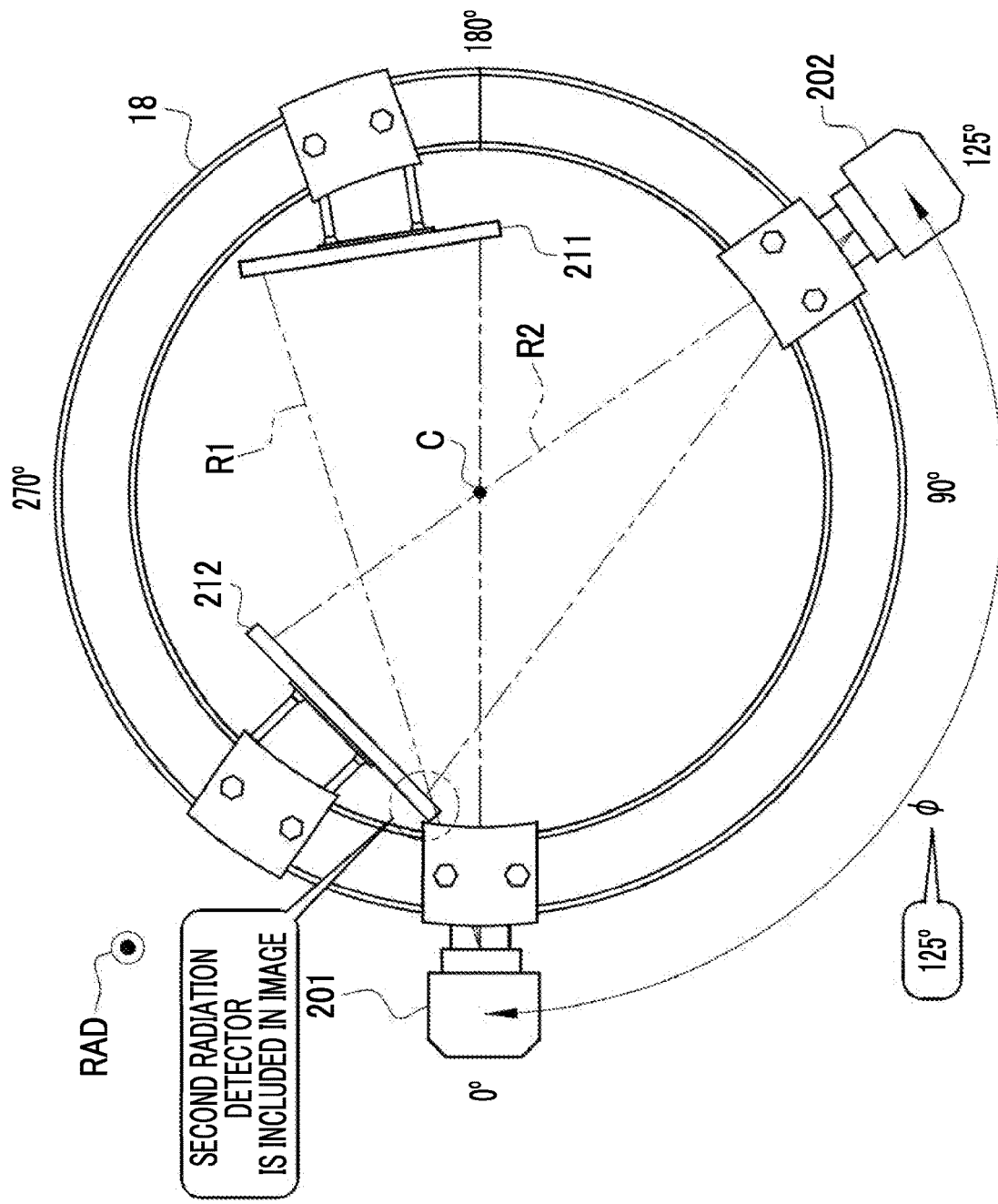
FIG. 18 is a diagram illustrating a case in which the second imaging unit is disposed at a position that is separated from the first imaging unit by 125°.

Further, in a case in which the size of the radiation detector 21 is reduced, the inclusion of the radiation detector 21 in the projection image as illustrated in FIG. 18 is avoided even though the angle φ is increased. However, as the size of the radiation detector 21 is reduced, a scan field of view sFOV (see FIG. 19) is reduced. Further, in a case in which the rotation radius of the radiation detector 21 (the distance between the rotation center C and the center point CS of the detection surface 58 of the radiation detector 21) increases, it is possible to increase the angle φ. However, since the radiation detector 21 is separated from the subject S, the scan field of view sFOV is also reduced in this case. Therefore, it is preferable that the ratio of the rotation radius of the radiation source 20 (the distance between the rotation center C and the focus of the radiation R of the radiation source 20) to the rotation radius of the radiation detector 21 is set to about 2:1 (for example, the rotation radius of the radiation source 20 is 800 mm, and the rotation radius of the radiation detector 21 is 400 mm) to secure a relatively wide scan field of view sFOV.

Alternatively, in a case in which the size of the frame 18 increases to increase the SID, it is possible to increase the angle φ without separating the radiation detector 21 from the subject S. However, it is necessary to prepare a high-output rotary motor 47 in accordance with the frame 18 that has become larger and heavier, or it is necessary to thicken the column 14 to increase rigidity. In addition, it is necessary to increase the power of the radiation R as the SID is longer. From the above, it is also preferable that the angle φ is about 120° as in this example.

Figure 19:
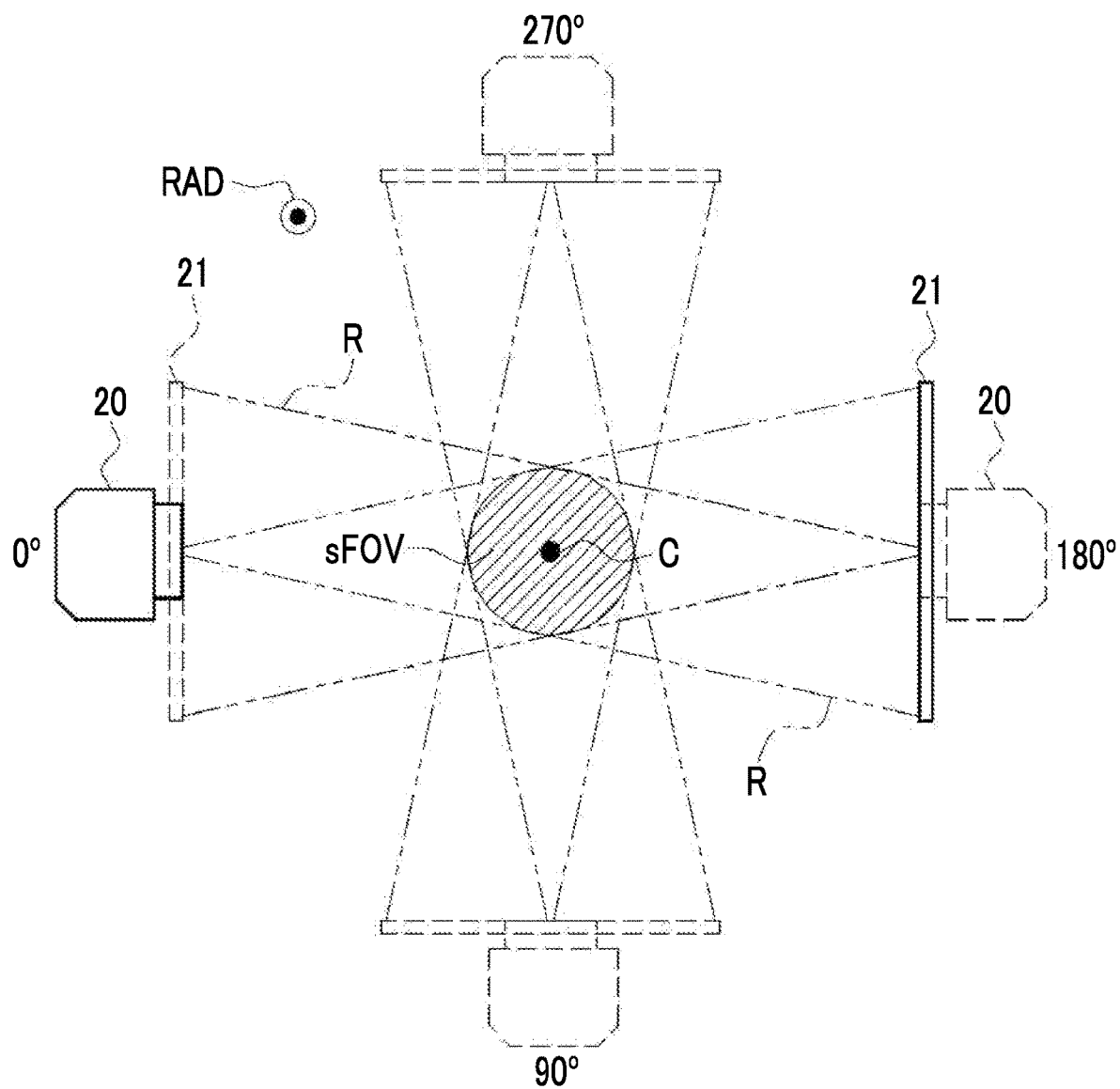
FIG. 19 is a diagram illustrating a scan field of view in a case in which the radiation detector is located at the reference position.
Figure 20:
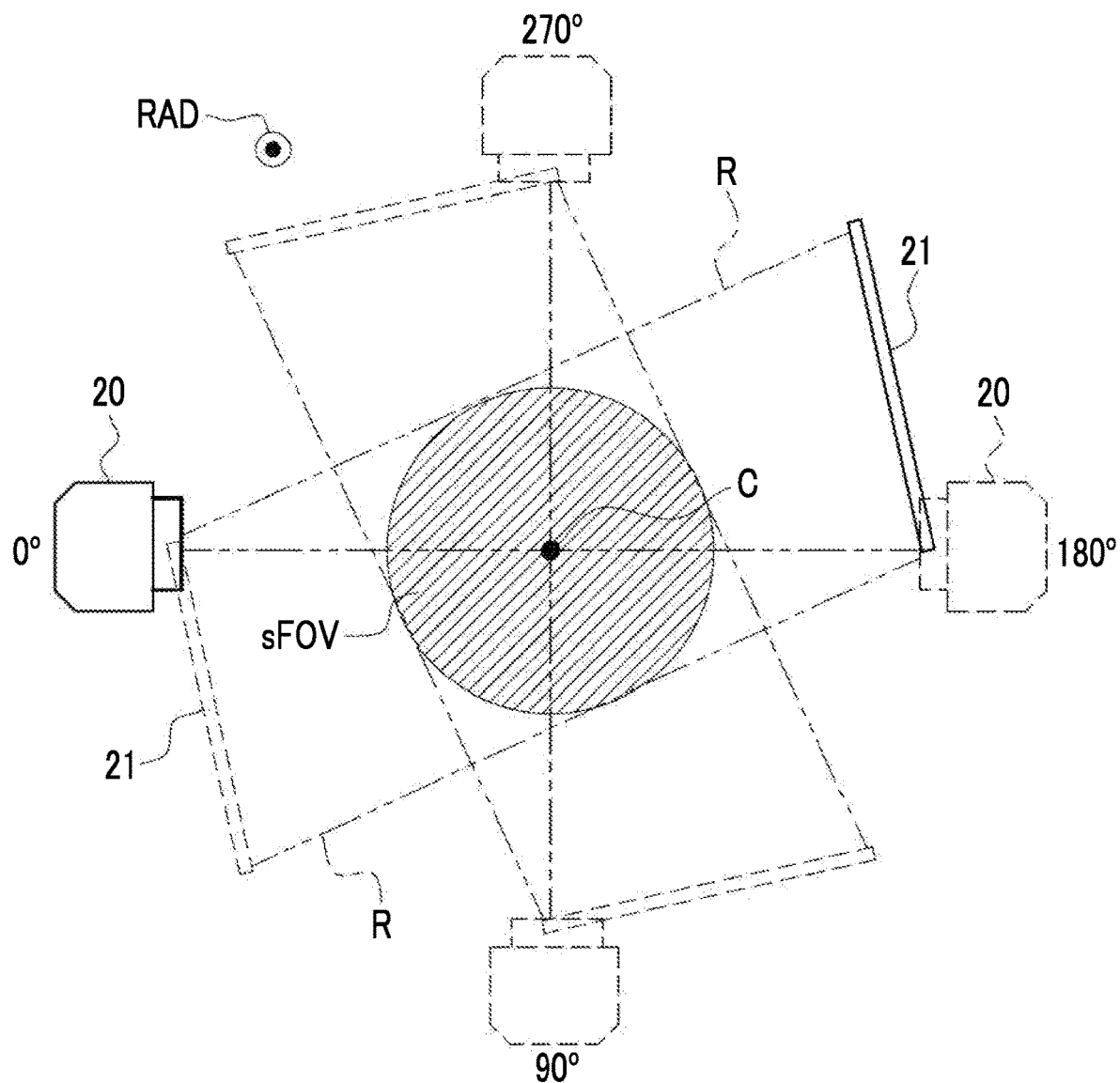
FIG. 20 is a diagram illustrating a scan field of view in a case in which the radiation detector is located at the offset position.

Here, as illustrated in FIG. 19, in a case in which the radiation detector 21 is disposed at the reference position, the region to be scanned does not change with a rotation of 360°. Therefore, the scan field of view sFOV stays in a relatively small region as represented by hatching. On the other hand, as illustrated in FIG. 20, in a case in which the radiation detector 21 is disposed at the offset position, the region to be scanned changes with a 360° rotation. Therefore, the scan field of view sFOV is a relatively large region as represented by hatching. Therefore, as illustrated in FIG. 9, in a case in which the radiation detector 21 is disposed at the offset position that is separated from the reference position facing the radiation source 20 by a preset angle as viewed from the rotation axis direction RAD, it is possible to widen the scan field of view sFOV, as compared to a case in which the radiation detector 21 is disposed at the reference position. In addition, the angle φ can be set to be slightly larger than that in a case in which the radiation detector 21 is disposed at the reference position.

The plurality of imaging units 30 are held by the frame 18, and the subject S is positioned in the frame 18. As illustrated in FIG. 8, as viewed from the rotation axis direction RAD, the radiation source 20 is disposed outside the frame 18, and the radiation detector 21 is disposed inside the frame 18. The scan field of view sFOV increases as the radiation source 20 is further away from the subject S and as the radiation detector 21 is closer to the subject S. Therefore, in a case in which the radiation source 20 is disposed outside the frame 18 in which the subject S is positioned and the radiation detector 21 is disposed inside the frame 18, it is possible to widen the scan field of view sFOV.

As illustrated in FIGS. 1, 2, and 4, the subject S is positioned in either the standing posture or the sitting posture. Therefore, it is possible to meet the demand to observe soft tissues, such as the lungs, in a natural state in which gravity is applied or to observe joints, such as hip joints, in a state in which gravity is applied and a load is applied. In addition, the CT apparatus may be used to image the subject S in a decubitus posture.

Figure 21:
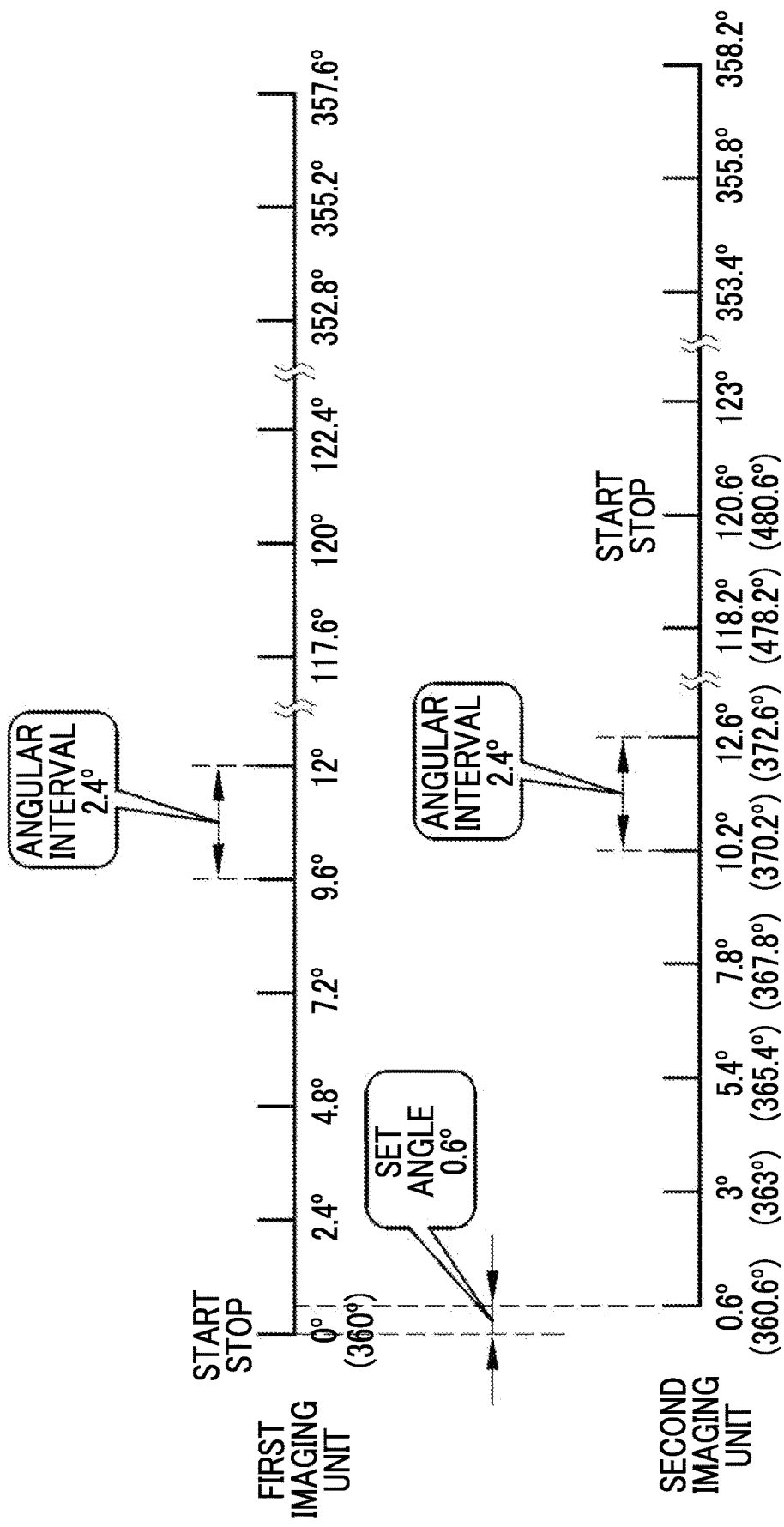
FIG. 21 is a diagram illustrating another example of the positions where the first imaging unit and the second imaging unit acquire the projection images.

In addition, the set angle may be less than the angular interval or may not necessarily be an angle obtained by equally dividing the angular interval. For example, as illustrated in FIG. 21, in a case in which the angular range is 2.4° which is the same as that in the example illustrated in FIG. 11, the second radiation source 202 may be disposed at a position that is separated from the first radiation source 201 by an angle of 120.6° (φ=120.6°) such that the set angle is 0.6°. In this case, the second imaging unit 302 outputs the projection image 125 at 123°, ..., 353.4°, 355.8°, 358.2°, 0.6° (360.6°), 3° (363°), 5.4° (365.4°), ..., using 120.6° at which the second radiation source 202 is disposed as the rotation start position and the rotation end position.

FIG. 22 illustrates some of the positions where the first imaging unit 301, the second imaging unit 302, and all of the imaging units 30 acquire the projection images 125 in the case illustrated in FIG. 21. Although an angular deviation occurs between the acquisition positions of the projection images 125, the number of positions where all of the imaging units 30 acquire the projection images 125 is twice the number of positions where one imaging unit 30 acquires the projection image 125 as in the example illustrated in FIG. 12. Therefore, in this case, it is also possible to obtain the effect of increasing the angular resolution of the projection image 125 without increasing the frame rate of the radiation detector 21 or decreasing the rotation speed of the imaging unit 30.

Second Embodiment

Ideally, the set angle has a design value. However, since the radiation source 20 and the like are assembled by a person, the set angle may inevitably differ from the design value due to a manufacturing error. Therefore, in a second embodiment, the time when the radiation source 20 emits the radiation R is changed to correct the deviation of the set angle including the manufacturing error.

Figure 23:
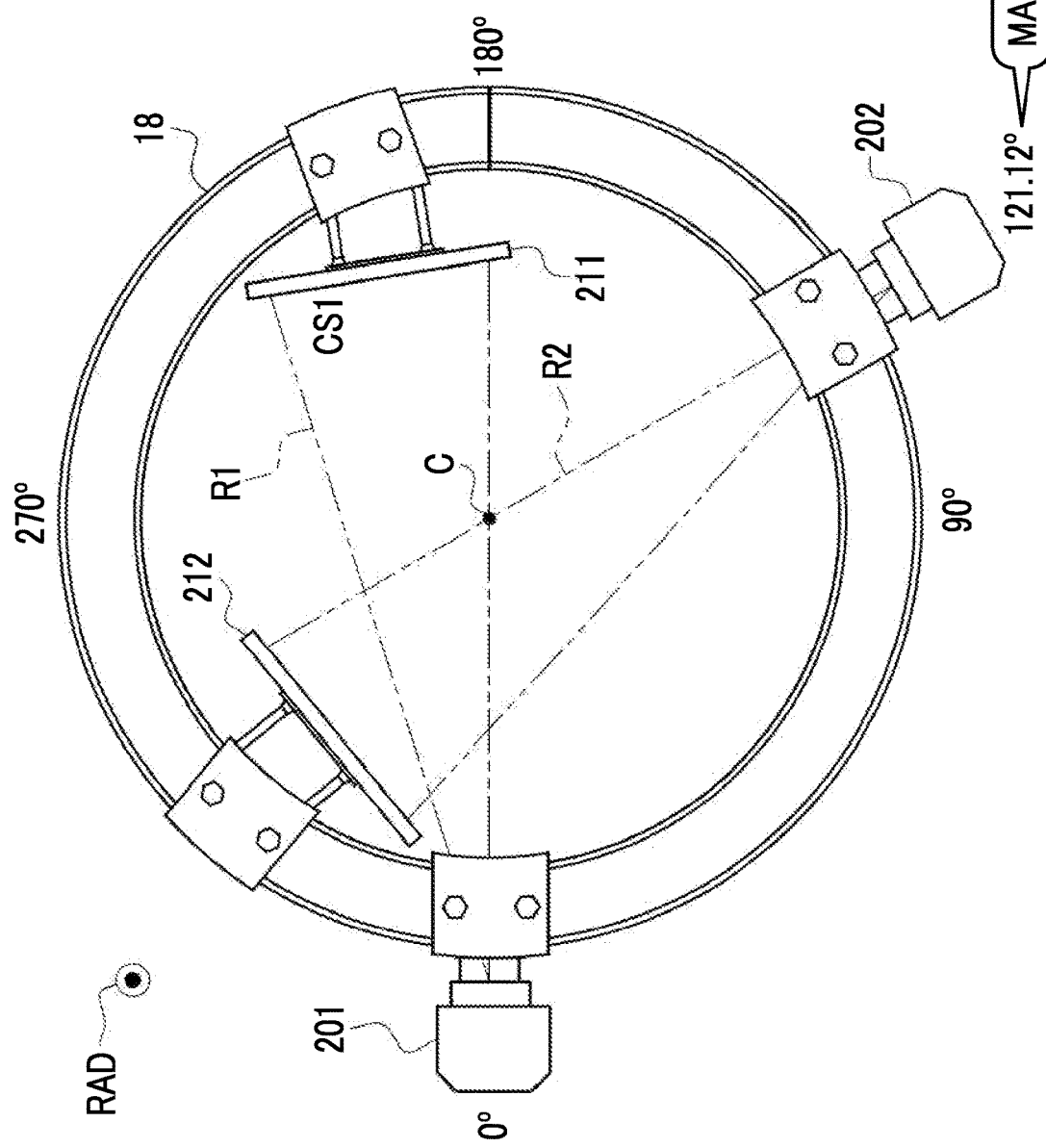
FIG. 23 is a diagram illustrating a case in which the set angle deviates due to a manufacturing error.
Figure 24:
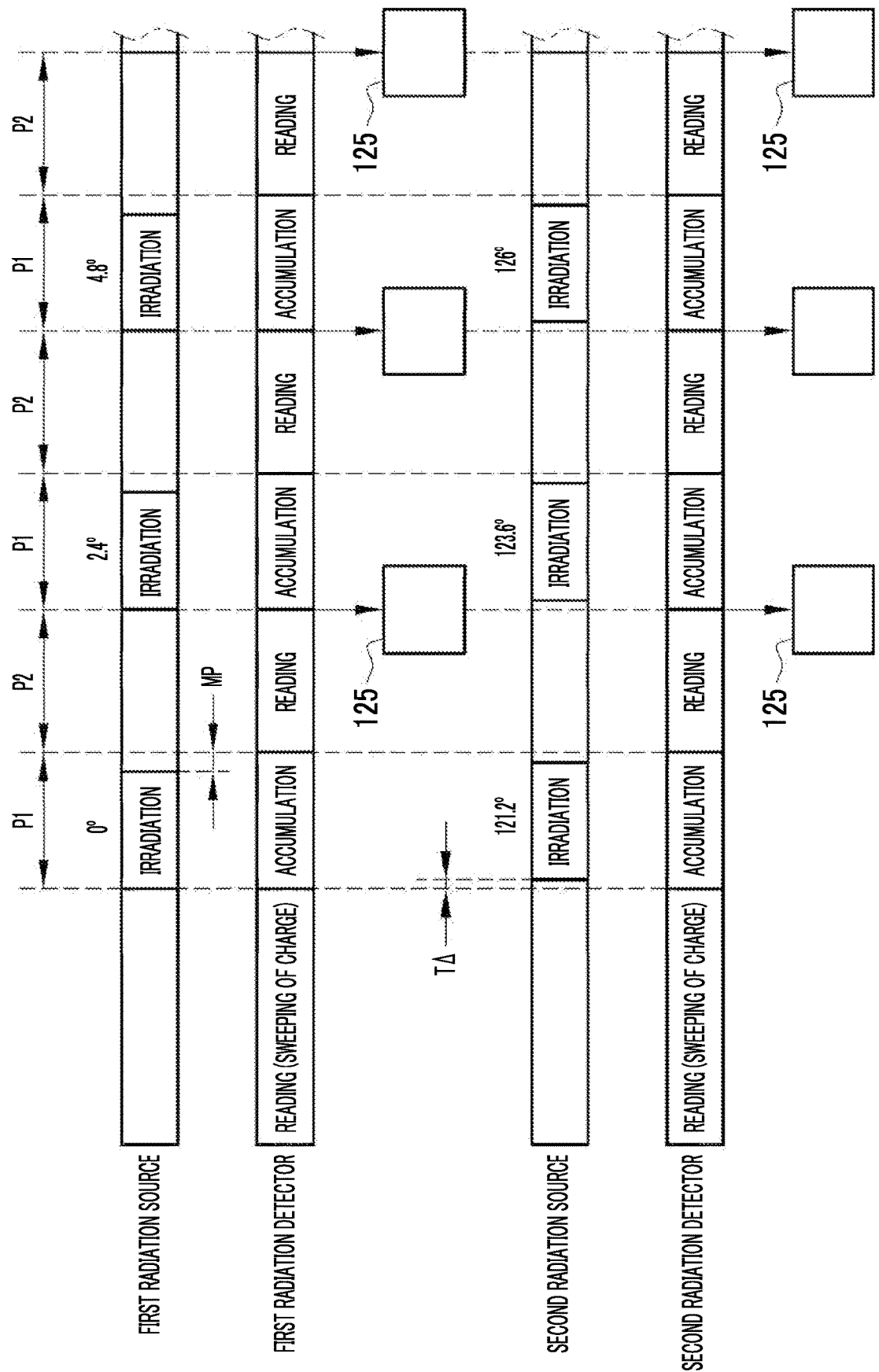
FIG. 24 is a diagram illustrating an aspect in which the deviation of the set angle including the manufacturing error is corrected by making the times when the radiation sources emit the radiation different from each other.

For example, a case is considered in which, although the angle φ should be set to 121.2 and the set angle should be set to 1.2° which is the design value as in the first embodiment, the angle φ becomes 121.12° due to a manufacturing error and the set angle deviates by 0.08° in the clockwise direction CW as illustrated in FIG. 23. In this case, for example, as illustrated in FIG. 24, a margin period MP is provided in the first period P1 such that the first period P1 is longer than the irradiation time from the start of the emission of the radiation R to the end of the emission. Then, the imaging control unit 112 delays the time when the second radiation source 202 emits the second radiation R2 in the first period P1 by a time TΔ to correct the deviation of the set angle including the manufacturing error. In a case in which the deviation of the set angle is 0.08° given as an example and the rotation speed of the imaging unit 30 is 36°/sec as described above, the time TΔ is 2.22 msec (=0.08/36).

The deviation of the set angle from the design value is measured in a case in which the CT apparatus 10 is manufactured and shipped. Then, the time TΔ is calculated on the basis of the measurement result, and the calculated time TΔ is stored in the storage 95. In a case in which imaging is performed, the time TΔ is given to the imaging control unit 112, and the imaging control unit 112 controls the irradiation time of the radiation R according to the time TΔ.

The length of the margin period MP is set according to an upper limit value of the manufacturing error of the set angle. In a case in which the upper limit value of the manufacturing error of the set angle is, for example, 0.6°, the length of the margin period MP is 16.7 msec (≈0.6/36). In addition, contrary to the above example, in a case in which the set angle deviates from the design value in the counterclockwise direction CCW, the time when the first radiation source 201 emits the first radiation R1 in the first period P1 is delayed.

As described above, in the second embodiment, the imaging control unit 112 changes the time when the radiation source 20 emits the radiation R to correct the deviation of the set angle including the manufacturing error. Therefore, it is possible to easily correct the deviation of the set angle including the manufacturing error. The assembly of the first radiation source 201 and the second radiation source 202 can be performed roughly to some extent.

Figure 25:
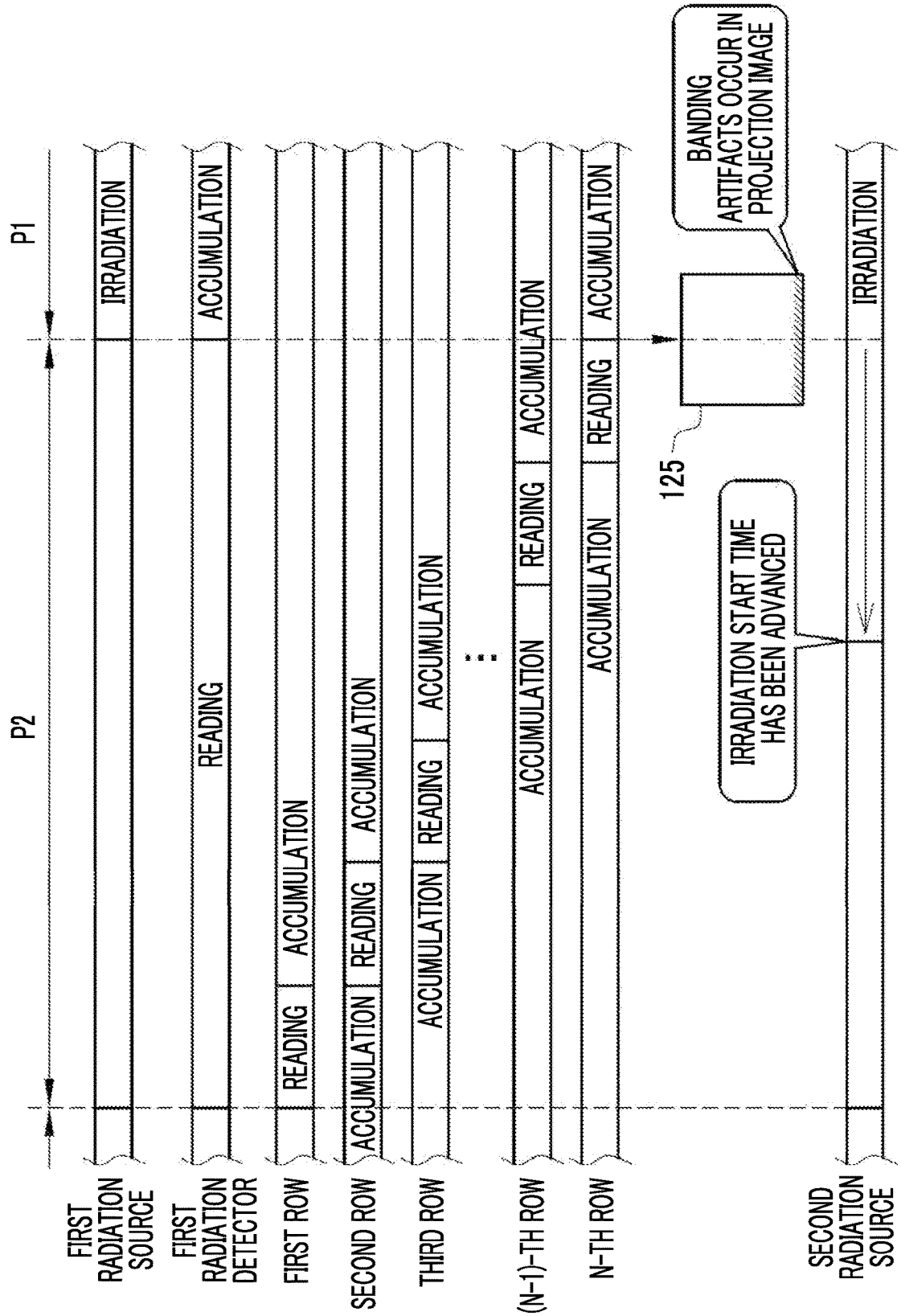
FIG. 25 is a diagram illustrating a case in which the time when the second radiation source emits the radiation has been advanced.

In addition, the following effects can be obtained by providing the margin period MP in the first period P1. For example, a case is considered in which the start time of the emission of the second radiation R2 by the second radiation source 202 is advanced for some reason in an aspect in which the margin period MP is not provided in the first period P1 as illustrated in FIG. 25. In this case, since the second radiation R2 is emitted during the accumulation period of the rows of the pixels 57 in the latter half of the previous frame, such as an (N−1)-th row and an N-th row, banding artifacts occur in the projection image 125 obtained from the first radiation detector 211. In addition, banding artifacts occur similarly in the projection image 125 in a case in which there is a deviation between the times of the reading operations of the projection images 125 by the radiation detectors 21 in the plurality of imaging units 30, which is not illustrated.

Figure 26:
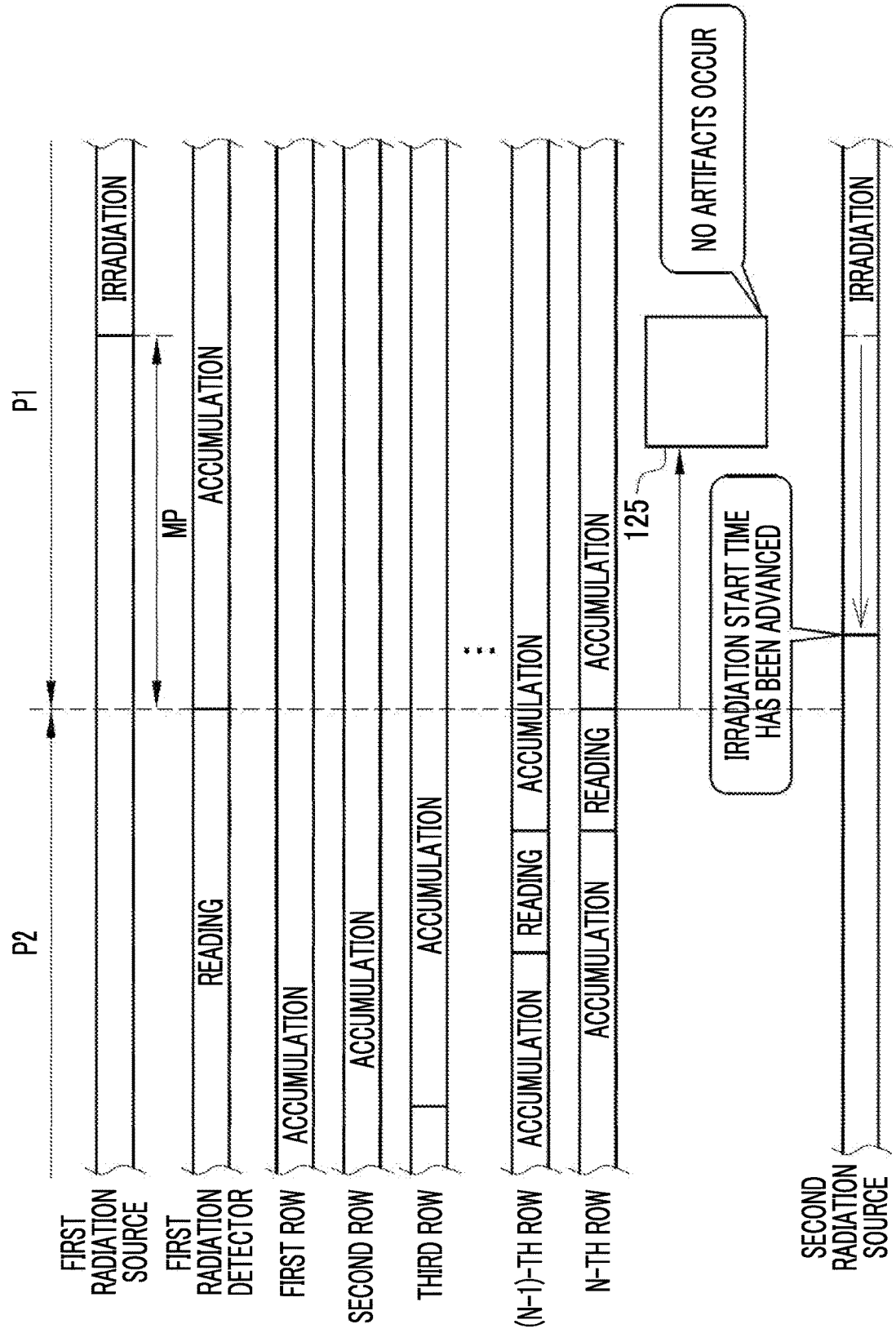
FIG. 26 is a diagram illustrating the effect of setting a first period to be longer than the irradiation time from the start of the emission of the radiation to the end of the emission of the radiation.

In contrast, the margin period MP is provided in the first period P1, and the first radiation source 201 and the second radiation source 202 are controlled such that the first radiation R1 and the second radiation R2 are emitted, for example, at an intermediate time point in the first period P1. Then, for example, as illustrated in FIG. 26, in a case in which the start time of the emission of the second radiation R2 by the second radiation source 202 has been advanced, but the difference between the start time of the emission of the second radiation R2 by the second radiation source 202 and the start time of the emission of the first radiation R1 by the first radiation source 201 is within the margin period MP, the second radiation R2 is not emitted during the accumulation period of the rows of the pixels 57 in the latter half of the previous frame. Therefore, the banding artifacts do not occur in the projection image 125 obtained from the first radiation detector 211. As described above, the margin period MP is provided in the first period P1, and the first period P1 is set to be longer than the irradiation time from the start of the emission of the radiation R to the end of the emission of the radiation R, which makes it possible to prevent the occurrence of the banding artifacts in the projection image 125.

Third Embodiment

Figure 27:
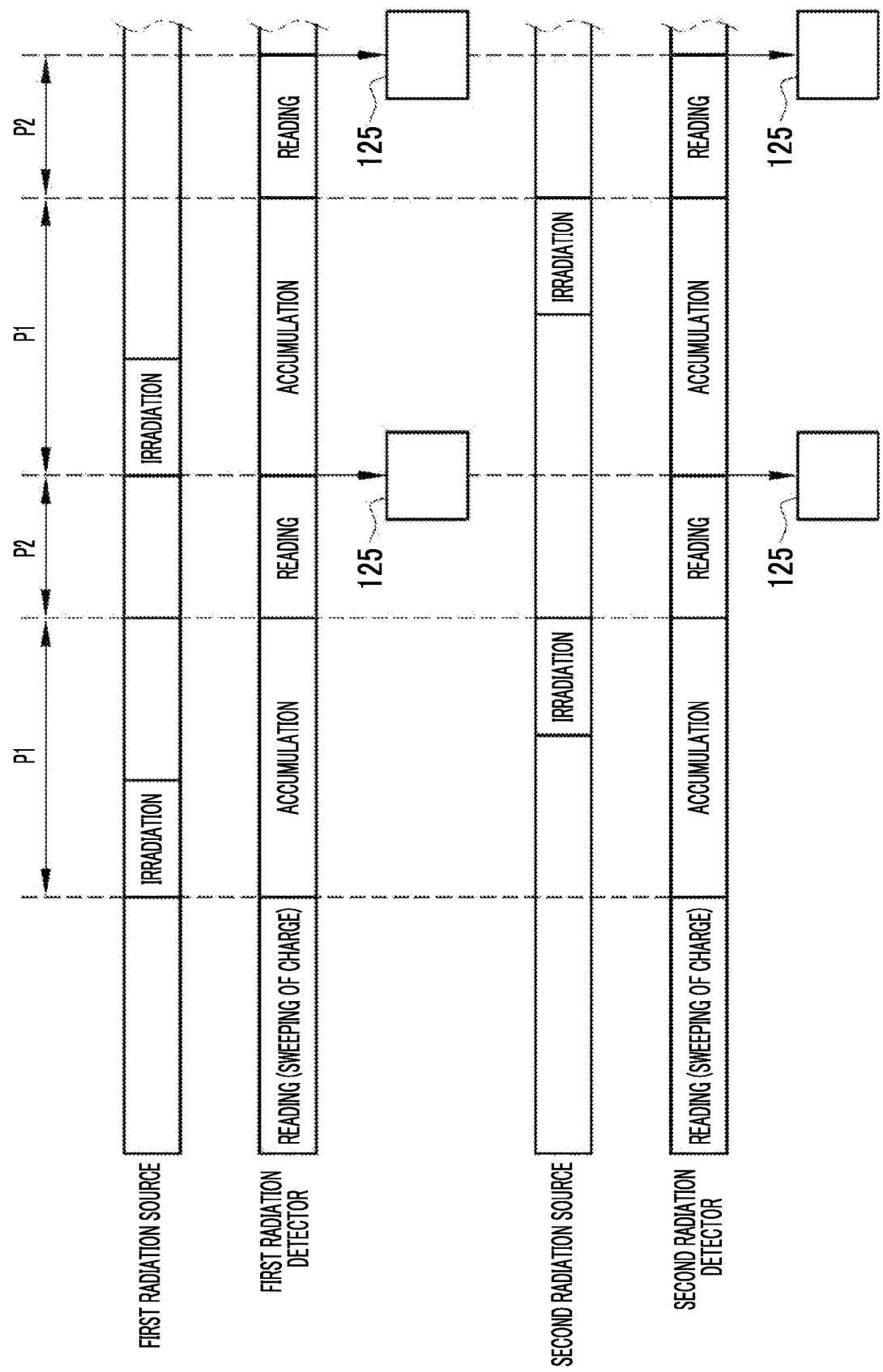
FIG. 27 is a diagram illustrating an aspect in which a plurality of imaging units emit the radiation at different times in the first period without overlapping.

In the first embodiment, in the first period P1, the first radiation source 201 and the second radiation source 202 emit the first radiation R1 and the second radiation R2 at the same time. However, the present disclosure is not limited thereto. For example, as illustrated in FIG. 27, the first radiation source 201 and the second radiation source 202 may emit the first radiation R1 and the second radiation R2 at different times in the first period P1 without overlapping. Specifically, the imaging control unit 112 directs the first radiation source 201 to emit the first radiation R1 in the first half of the first period P1 and directs the second radiation source 202 to emit the second radiation R2 in the second half of the first period P1 after the emission of the first radiation R1 is ended.

As described above, in the third embodiment, the imaging control unit 112 directs a plurality of imaging units 30 to emit the radiation R at different times in the first period P1 without overlapping. Therefore, a voltage generator that generates a tube voltage applied to the radiation tube 55 can be shared by the plurality of imaging units 30, and the supply destinations of the tube voltage can be switched by, for example, a switch. In a case in which the radiation R is emitted from the plurality of imaging units 30 at the same time, it is necessary to prepare the voltage generator for each of the plurality of imaging units 30. However, it is possible to simplify the configuration of the apparatus as compared to this aspect. In addition, since the backscattered rays of the radiation R of one of the imaging units 30 do not affect the other imaging unit 30, it is possible to obtain a projection image having relatively good quality.

However, the time required for imaging is longer than that in a case in which the plurality of imaging units 30 emit the radiation R at the same time since the plurality of imaging units 30 emit the radiation R at different times. Therefore, the intensity of the radiation R per unit time may be increased to shorten the irradiation time of the radiation R.

Fourth Embodiment

Figure 28:
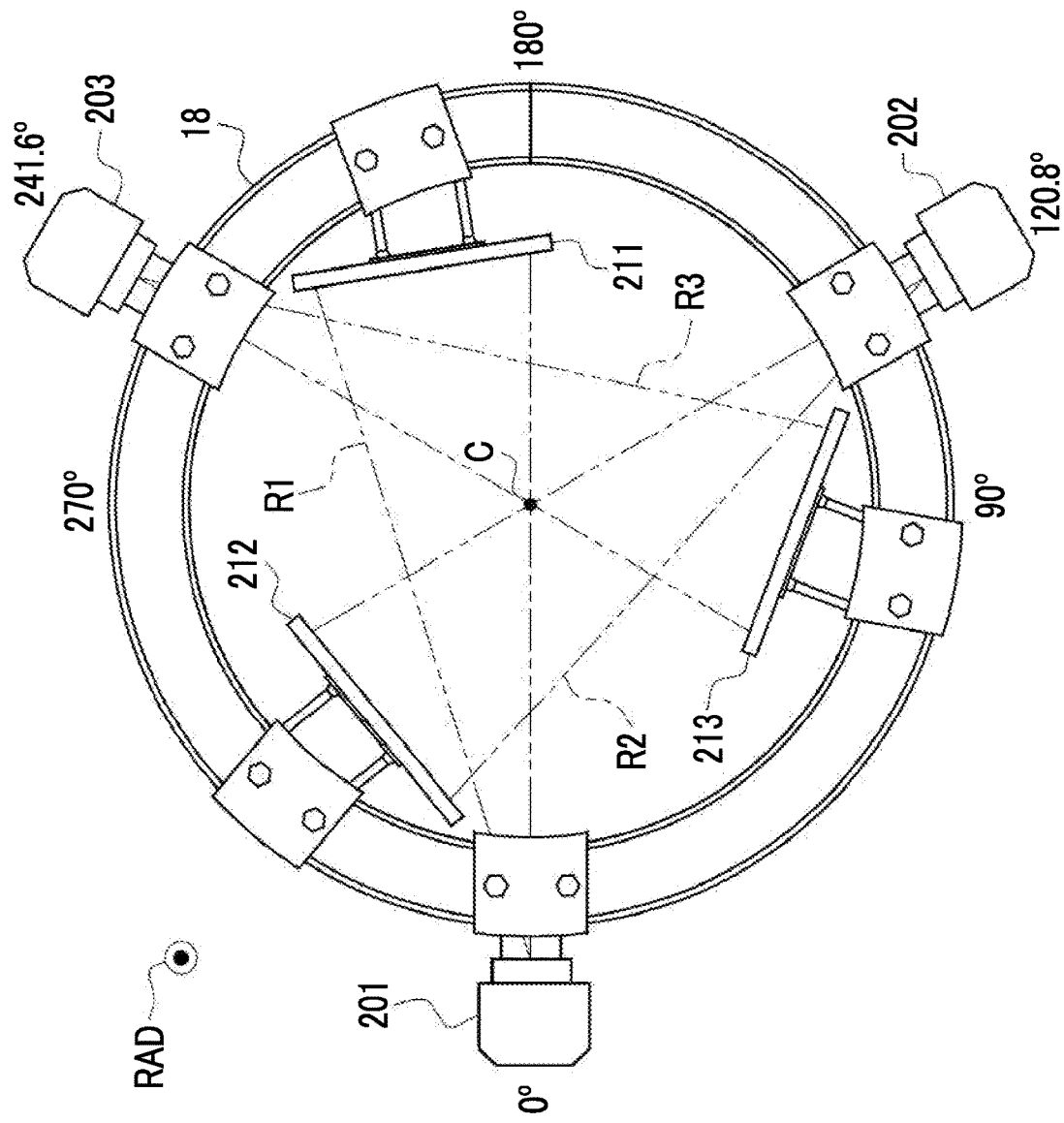
FIG. 28 is a diagram illustrating an example in which three imaging units are provided.
Figure 29:
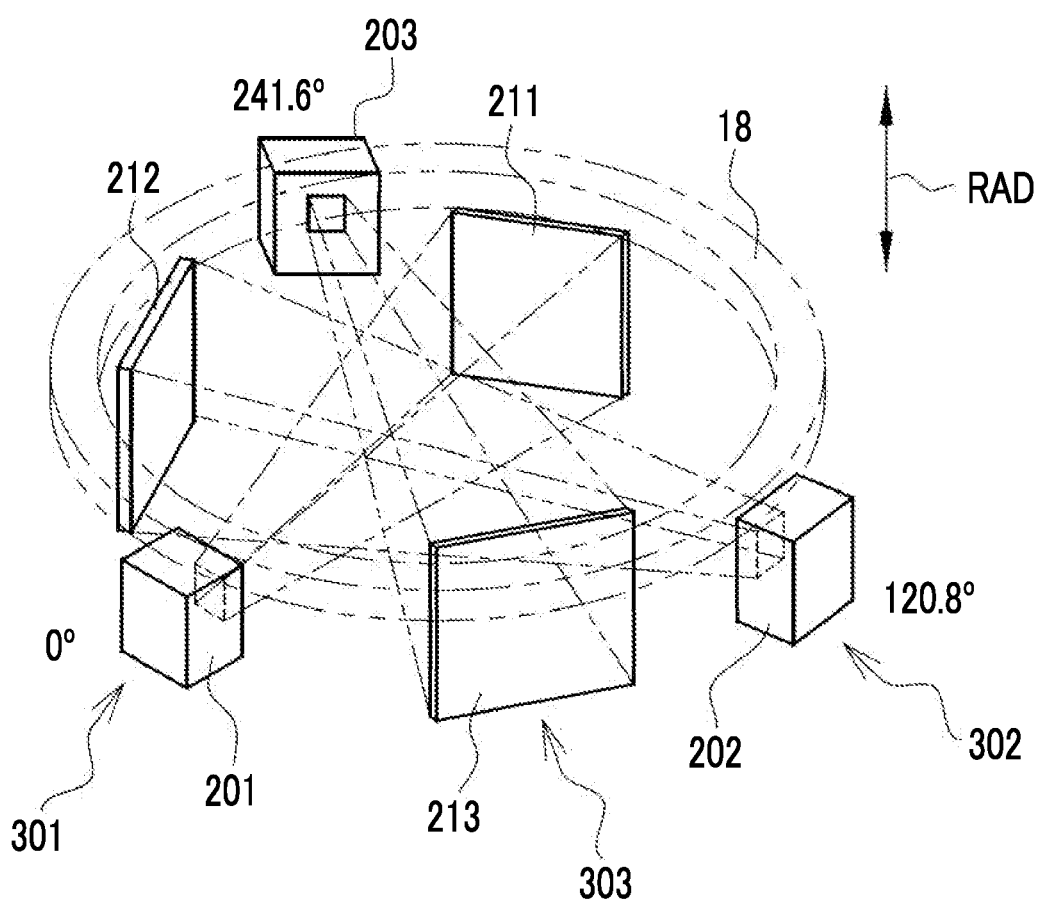
FIG. 29 is a diagram illustrating configurations of the first imaging unit, the second imaging unit, and a third imaging unit.

In each of the above-described embodiments, two imaging units 30 of the first imaging unit 301 and the second imaging unit 302 are given as an example. However, the number of imaging units 30 is not limited thereto. For example, as illustrated in FIGS. 28 and 29, three imaging units 30 of the first imaging unit 301, the second imaging unit 302, and a third imaging unit 303 may be provided.

In this case, the second radiation source 202 is disposed at a position that is separated from the first radiation source 201 by 120.8° as viewed from the rotation axis direction RAD. The third imaging unit 303 is composed of a third radiation source 203 that emits third radiation R3 and a third radiation detector 213. The third radiation source 203 is disposed at a position that is separated from the first radiation source 201 by 241.6° (a position that is separated from the second radiation source 202 by 120.8°) as viewed from the rotation axis direction RAD. In addition, all of the first radiation detector 211, the second radiation detector 212, and the third radiation detector 213 are disposed at the offset positions illustrated in FIG. 9.

Figure 30:
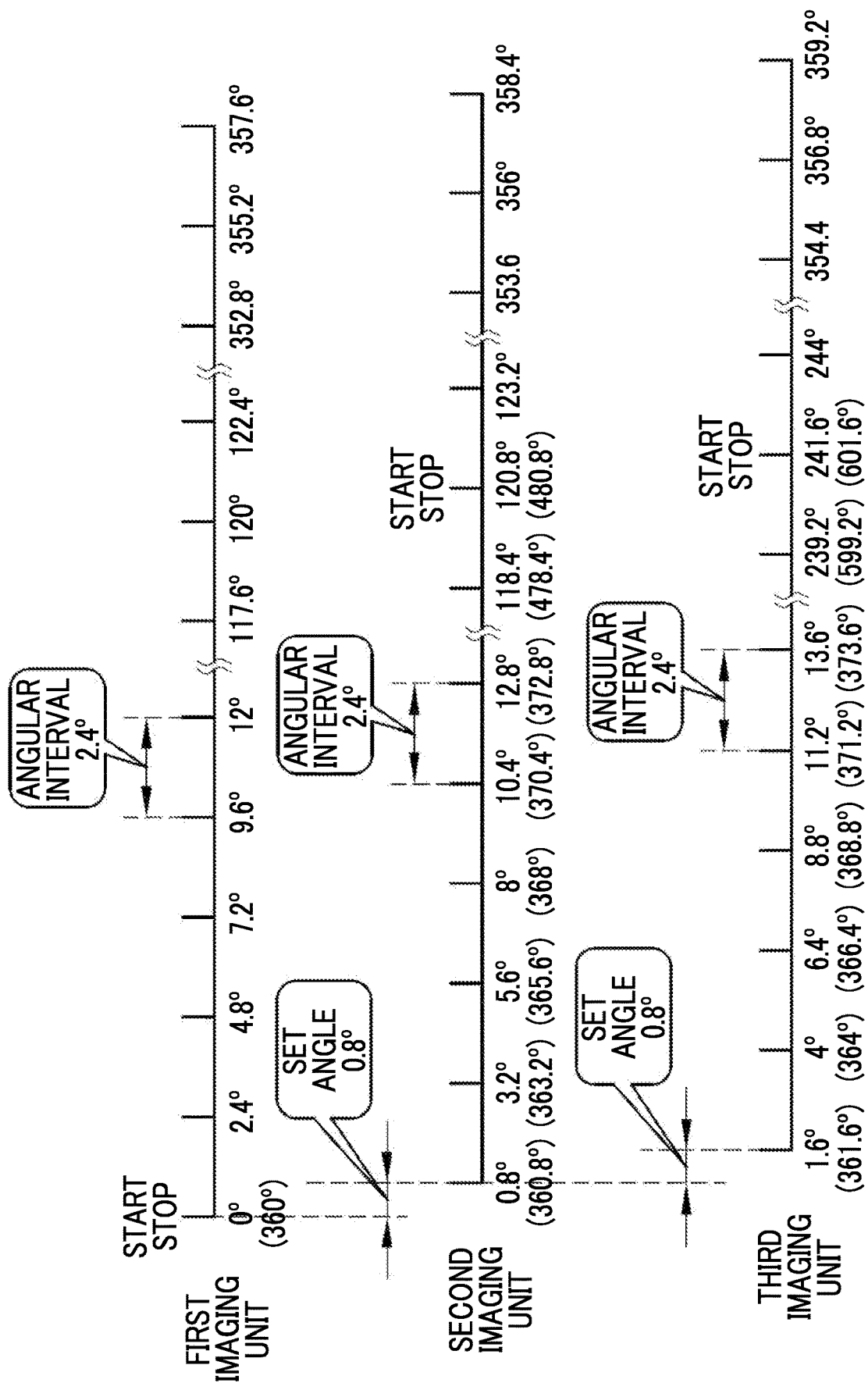
FIG. 30 is a diagram illustrating positions where the first imaging unit, the second imaging unit, and the third imaging unit acquire the projection images.

For example, as illustrated in FIG. 30, the first imaging unit 301 outputs the projection image 125 at an angular interval of 2.4°, for example, at 2.4°, 4.8°, 7.2°, ..., 117.6°, 120°, 122.4°, ..., 352.8°, 355.2°, and 357.6°, using 0° at which the first radiation source 201 is disposed as the rotation start position and the rotation end position, as in the first embodiment. The second imaging unit 302 outputs the projection image 125 at an angular interval of 2.4°, for example, at 123.2°, ..., 353.6°, 356°, 358.4, 0.8° (360.8°), 3.2° (363.2°), 5.6° (365.6°), ..., using 120.8° at which the second radiation source 202 is disposed as the rotation start position and rotation end position. In addition, the third imaging unit 303 outputs the projection image 125 at an angular interval of 2.4°, for example, at 244°, ..., 354.4°, 356.8°, 359.2°, 1.6° (361.6°), 4° (364°), 6.4° (366.4°), ...

, using 241.6° at which the third radiation source 203 is disposed as the rotation start position and rotation end position.

Since the second radiation source 202 is disposed at a position of 120.8°, the positions where the first imaging unit 301 and the second imaging unit 302 acquire the projection images 125 are separated from each other by 0.8° which is ⅓ of the angular interval of 2.4°. In other words, the first imaging unit 301 and the second imaging unit 302 are disposed such that the acquisition positions of the projection images 125 are separated from each other by 0.8°. In addition, since the third radiation source 203 is disposed at a position of 241.6°, the positions where the first imaging unit 301 and the third imaging unit 303 acquire the projection images 125 are separated from each other by 1.6° which is ⅔ of the angular interval of 2.4°. In other words, the first imaging unit 301 and the third imaging unit 303 are disposed such that the acquisition positions of the projection images 125 are separated from each other by 1.6°. Therefore, the second imaging unit 302 and the third imaging unit 303 can acquire the projection images 125 at positions of 0.8° and 1.6° between 0° and 2.4°, 3.2° and 4° between 2.4° and 4.8°, . . . , 353.6° and 354.4° between 352.8° and 355.2°, and 356° and 356.8° between 355.2° and 357.6° which are not captured by the first imaging unit 301. Here, 0.8° and 1.6° are angles obtained by dividing 2.4° that is the angular interval into three equal parts and are examples of the "set angle" according to the technology of the present disclosure.

As described above, even in a case in which three imaging units 30 are provided, it is possible to obtain the effect of increasing the angular resolution of the projection image 125 without increasing the frame rate of the radiation detector 21 or reducing the rotation speed of the imaging unit 30. In this case, the frame rate of the radiation detector 21 is substantially 45 fps.

In addition, the frame 18 has a certain weight. Further, since the weight of the frame 18 is further increased by providing a plurality of imaging units 30, the inertial moment of the frame 18 is further increased. Therefore, for example, as illustrated in a graph of FIG. 31, in practice, an acceleration period AP from the start of the rotation to constant-speed rotation and a deceleration period DP from the constant-speed rotation to the stop of the rotation are a time of T1-T0 and a time of T3-T2, respectively. Therefore, for example, in a case in which the frame 18 is rotated once (rotated by 360°), the frame 18 is rotated by 360° in the constant-speed period CSP, and each of the acceleration period AP and the deceleration period DP is ended with a rotation of 20°. Therefore, in practice, the frame 18 is rotated by 400°.

Figure 31:
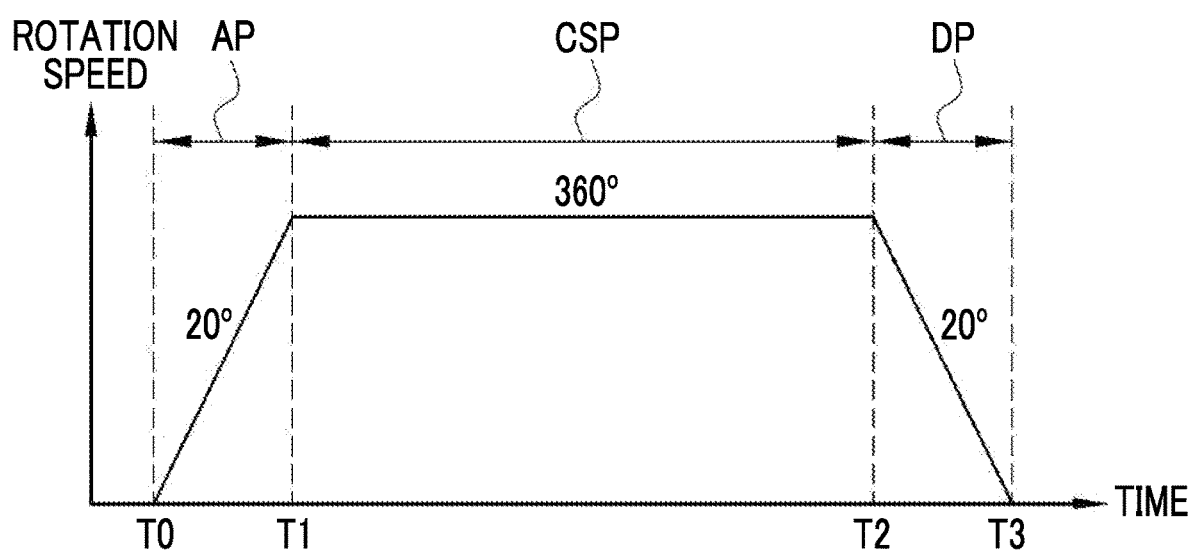
FIG. 31 is a graph illustrating a change in a rotation speed of a frame over time.

The frame 18 does not have a mechanism, such as a slip ring, and is supplied with power through a wiring line. Therefore, the frame 18 has a limit rotation angle corresponding to the length of the wiring line. Therefore, as a safety measure, it is preferable to provide a mechanical switch that forcibly cuts off the supply of power to the rotary motor 47 in a case in which the rotation angle of the frame 18 in one direction reaches the limit rotation angle. In a case in which the frame 18 is actually rotated by 400° for the 360° rotation of the frame 18 as illustrated in FIG. 31, a rotation angle converter for converting the rotation of 400° into the rotation of 360° may be connected to the potentiometer 48 of the rotation mechanism 45.

For example, in a case in which a relatively wide range, such as the whole body, is imaged, the frame 18 may be raised and lowered two or more times to perform imaging in two or more steps.

An elevating mechanism may be provided in at least one of the plurality of imaging units 30 to raise and lower the imaging units 30 in the rotation axis direction RAD.

A mechanism that moves the radiation source 20 and the radiation detector 21 along a circumferential direction of the frame 18 may be provided to change the positions where the radiation source 20 and the radiation detector 21 are disposed. This configuration makes it possible to retract the radiation source 20 and the radiation detector 21 that interfere with the guidance of the subject S into the apparatus main body 11 to positions that do not interfere with the guidance.

The number of columns 14 may be four or five. Further, a stepping motor may be used as the rotary motor 47, and the rotation position of the frame 18 may be determined by the number of pulses applied to the rotary motor 47. Furthermore, the frame 18 is not limited to the circular ring and may be a polygonal ring.

The hardware configuration of the computer constituting the control device 12 can be modified in various ways. For example, the control device 12 may be configured by a plurality of computers separated as hardware in order to improve processing capacity and reliability. For example, the functions of the receiving unit 110, the RW control unit 111, and the display control unit 114 and the functions of the imaging control unit 112 and the image processing unit 113 are distributed to two computers. In this case, the two computers constitute the control device 12.

As described above, the hardware configuration of the computer of the control device 12 can be appropriately changed according to required performances, such as processing capacity, safety, and reliability. Further, not only the hardware but also an application program, such as the operation program 105, may be duplicated or may be dispersively stored in a plurality of storages in order to secure safety and reliability.

In each of the above-described embodiments, for example, the following various processors can be used as the hardware structure of processing units performing various processes, such as the receiving unit 110, the RW control unit 111, the imaging control unit 112, the image processing unit 113, and the display control unit 114. The various processors include, for example, the CPU 97 which is a general-purpose processor executing software (operation program 105) to function as various processing units, a programmable logic device (PLD), such as a field programmable gate array (FPGA), which is a processor whose circuit configuration can be changed after manufacture, and/or a dedicated electric circuit, such as an application specific integrated circuit (ASIC), which is a processor having a dedicated circuit configuration designed to perform a specific process.

One processing unit may be configured by one of the various processors or by a combination of two or more processors of the same type or different types (for example, a combination of a plurality of FPGAs and/or a combination of a CPU and an FPGA). In addition, a plurality of processing units may be configured by one processor.

A first example of the configuration in which a plurality of processing units are configured by one processor is an aspect in which one processor is configured by a combination of one or more CPUs and software and functions as a plurality of processing units. A representative example of this aspect is a client computer or a server computer. A second example of the configuration is an aspect in which a processor that implements the functions of the entire system including a plurality of processing units using one integrated circuit (IC) chip is used. A representative example of this aspect is a system-on-chip (SoC). As described above, various processing units are configured by using one or more of the various processors as a hardware structure.

In addition, specifically, an electric circuit (circuitry) obtained by combining circuit elements, such as semiconductor elements, can be used as the hardware structure of the various processors.

It is possible to understand the techniques described in the following supplementary notes from the above description.

Supplementary Note 1

A computed tomography apparatus comprising:
a plurality of imaging units each of which includes a radiation source that emits radiation having a quadrangular pyramid shape to a subject and a radiation detector in which a plurality of pixels detecting the radiation transmitted through the subject are two-dimensionally arranged;
a rotation mechanism that rotates the plurality of imaging units around a body axis of the subject while maintaining a disposition interval; and
a processor that controls operations of the plurality of imaging units and the rotation mechanism,
wherein an angular interval that is determined by a frame rate of the radiation detector and a rotation speed of the imaging unit and that defines an acquisition time of a projection image based on the radiation is the same for the plurality of imaging units,
the plurality of imaging units have different phases in a rotation direction, and
positions where the plurality of imaging units acquire the projection images are separated by a set angle that is less than the angular interval.

Supplementary Note 2

The computed tomography apparatus according to Supplementary Note 1,
wherein the set angle is an angle obtained by equally dividing the angular interval.

Supplementary Note 3

The computed tomography apparatus according to Supplementary Note 1 or 2,
wherein the processor makes times when the radiation sources emit the radiation different from each other to correct deviation of the set angle including a manufacturing error.

Supplementary Note 4

The computed tomography apparatus according to any one of Supplementary Notes 1 to 3,
wherein the processor directs all of the plurality of imaging units to emit the radiation during a preset first period and directs all of the plurality of imaging units to output the projection images during a preset second period following the first period.

Supplementary Note 5

The computed tomography apparatus according to Supplementary Note 4,
wherein the processor directs the plurality of imaging units to emit the radiation at the same time in the first period and directs the plurality of imaging units to output the projection images at the same time in the second period.

Supplementary Note 6

The computed tomography apparatus according to Supplementary Note 4 or 5,
wherein the first period is longer than an irradiation time from a start of the emission of the radiation to an end of the emission of the radiation.

Supplementary Note 7

The computed tomography apparatus according to Supplementary Note 4,
wherein the processor directs the plurality of imaging units to emit the radiation at different times in the first period without overlapping.

Supplementary Note 8

The computed tomography apparatus according to any one of Supplementary Notes 1 to 7,
wherein the plurality of imaging units are disposed at positions that are separated by an angle that is greater than 90° as viewed from a rotation axis direction of the plurality of imaging units.

Supplementary Note 9

The computed tomography apparatus according to any one of Supplementary Notes 1 to 8,
wherein the radiation detector is disposed at an offset position that is separated from a reference position facing the radiation source by a preset angle as viewed from the rotation axis direction of the plurality of imaging units.

Supplementary Note 10

The computed tomography apparatus according to any one of Supplementary Notes 1 to 9,
wherein the plurality of imaging units are held in a frame, the subject is positioned in the frame, and
the radiation source is disposed outside the frame, and the radiation detector is disposed inside the frame as viewed from the rotation axis direction of the plurality of imaging units.

Supplementary Note 11

The computed tomography apparatus according to any one of Supplementary Notes 1 to 10,
wherein the subject is positioned in either a standing posture or a sitting posture.

In the technology of the present disclosure, the above-described various embodiments and/or various modification examples may be combined with each other as appropriate. In addition, the present disclosure is not limited to the above-described embodiments, and various configurations can be used without departing from the gist of the present disclosure. Furthermore, the technology of the present disclosure extends to a storage medium that non-temporarily stores a program, in addition to the program.

The above descriptions and illustrations are detailed descriptions of portions related to the technology of the present disclosure and are merely examples of the technology of the present disclosure. For example, the above description of the configurations, functions, operations, and effects is the description of examples of the configurations, functions, operations, and effects of portions related to the technology of the present disclosure. Therefore, unnecessary portions may be deleted or new elements may be added or replaced in the above descriptions and illustrations without departing from the gist of the technology of the present disclosure. In addition, in the above descriptions and illustrations, the description of, for example, common technical knowledge that does not need to be particularly described to enable the implementation of the technology of the present disclosure is omitted in order to avoid confusion and facilitate the understanding of portions related to the technology of the present disclosure.

In the specification, "A and/or B" is synonymous with "at least one of A or B". That is, "A and/or B" means only A, only B, or a combination of A and B. Further, in the specification, the same concept as "A and/or B" is applied to a case in which the connection of three or more matters is expressed by "and/or".

All of the documents, the patent applications, and the technical standards described in the specification are incorporated by reference herein to the same extent as each individual document, each patent application, and each technical standard are specifically and individually stated to be incorporated by reference.

What is claimed is:

1. A computed tomography apparatus comprising:
a plurality of imaging units each of which includes a radiation source that emits radiation having a quadrangular pyramid shape to a subject and a radiation detector in which a plurality of pixels detecting the radiation transmitted through the subject are two-dimensionally arranged;
a rotation mechanism that rotates the plurality of imaging units around a body axis of the subject while maintaining a disposition interval; and
a processor that controls operations of the plurality of imaging units and the rotation mechanism,
wherein an angular interval that is determined by a frame rate of the radiation detector and a rotation speed of the imaging unit and that defines an acquisition time of a projection image based on the radiation is the same for the plurality of imaging units,
the plurality of imaging units have different phases in a rotation direction, and
positions where the plurality of imaging units acquire the projection images are separated by a set angle that is less than the angular interval.

2. The computed tomography apparatus according to claim 1,
wherein the set angle is an angle obtained by equally dividing the angular interval.

3. The computed tomography apparatus according to claim 1,
wherein the processor makes times when the radiation sources emit the radiation different from each other to correct deviation of the set angle including a manufacturing error.

4. The computed tomography apparatus according to claim 1,
wherein the processor directs all of the plurality of imaging units to emit the radiation during a preset first period and directs all of the plurality of imaging units to output the projection images during a preset second period following the first period.

5. The computed tomography apparatus according to claim 4,
wherein the processor directs the plurality of imaging units to emit the radiation at the same time in the first period and directs the plurality of imaging units to output the projection images at the same time in the second period.

6. The computed tomography apparatus according to claim 4,
wherein the first period is longer than an irradiation time from a start of the emission of the radiation to an end of the emission of the radiation.

7. The computed tomography apparatus according to claim 4,
wherein the processor directs the plurality of imaging units to emit the radiation at different times in the first period without overlapping.

8. The computed tomography apparatus according to claim 1,
wherein the plurality of imaging units are disposed at positions that are separated by an angle that is greater than 90° as viewed from a rotation axis direction of the plurality of imaging units.

9. The computed tomography apparatus according to claim 1,
wherein the radiation detector is disposed at an offset position that is separated from a reference position facing the radiation source by a preset angle as viewed from a rotation axis direction of the plurality of imaging units.

10. The computed tomography apparatus according to claim 1,
wherein the plurality of imaging units are held in a frame, the subject is positioned in the frame, and
the radiation source is disposed outside the frame, and the radiation detector is disposed inside the frame as viewed from a rotation axis direction of the plurality of imaging units.

11. The computed tomography apparatus according to claim 1,
wherein the subject is positioned in either a standing posture or a sitting posture.

* * * * *